US011836802B2

(12) United States Patent
Carver et al.

(10) Patent No.: US 11,836,802 B2
(45) Date of Patent: Dec. 5, 2023

(54) VEHICLE OPERATION ANALYTICS, FEEDBACK, AND ENHANCEMENT

(71) Applicant: Speedgauge, Inc., San Francisco, CA (US)

(72) Inventors: Christopher J. Carver, Bainbridge Island, WA (US); Jonathan Hubbard, San Francisco, CA (US)

(73) Assignee: Speedgauge, Inc., San Francisco, CA (US)

( * ) Notice: Subject to any disclaimer, the term of this patent is extended or adjusted under 35 U.S.C. 154(b) by 279 days.

(21) Appl. No.: 16/852,037

(22) Filed: Apr. 17, 2020

(65) Prior Publication Data

US 2020/0334762 A1      Oct. 22, 2020

Related U.S. Application Data

(63) Continuation-in-part of application No. 16/103,441, filed on Aug. 14, 2018, which is a continuation of
(Continued)

(51) Int. Cl.
*B60W 30/09*      (2012.01)
*G06Q 40/08*      (2012.01)
*G07C 5/00*       (2006.01)

(52) U.S. Cl.
CPC ............. *G06Q 40/08* (2013.01); *B60W 30/09* (2013.01); *B60W 2520/10* (2013.01); *G07C 5/008* (2013.01)

(58) Field of Classification Search
CPC .. G06Q 40/08; B60W 30/09; B60W 2520/10; G07C 5/008; G07C 5/0825
See application file for complete search history.

(56) References Cited

U.S. PATENT DOCUMENTS 6,226,591 B1 * 5/2001 Okumura ......... G08G 1/096827
701/454
8,751,563 B1    6/2014 Warden et al.
(Continued)

FOREIGN PATENT DOCUMENTS

JP         2004280454 A   * 10/2004
WO     WO-2019023589 A1  *  1/2019 ............... A23L 2/52

OTHER PUBLICATIONS

U.S. Appl. No. 16/797,293 Office Action dated Apr. 14, 2022.
U.S. Appl. No. 16/797,293 Final Office Action dated Sep. 29, 2022.

*Primary Examiner* — Donald J Wallace
*Assistant Examiner* — Daniel M. Robert
(74) *Attorney, Agent, or Firm* — Polsinelli LLP

(57) ABSTRACT

The present disclosure is directed to methods and apparatus for controlling a vehicle based on motion or kinematic data received by a computer when the behavior of a driver is being monitored. Such methods and apparatus may generate one or more safety indices that may include a driver score, a vehicle safety score, and/or an environment safety score. These safety indices may optionally be weighted and combined into an overall safety score, grade, or index. The safety scores or indices may be used to generate a personalized speed threshold or acceleration threshold for a vehicle and/or a driver of the vehicle. Methods and apparatus consistent with the present disclosure may result in the speed of a vehicle being reduced, an increase in vehicle location accuracy, or functions such as headlights or windshield wipers or automated driving assistance being turned on to increase safety.

12 Claims, 10 Drawing Sheets

Related U.S. Application Data application No. 14/687,099, filed on Apr. 15, 2015, now Pat. No. 10,049,408.

(60) Provisional application No. 62/842,458, filed on May 2, 2019, provisional application No. 61/979,972, filed on Apr. 15, 2014.

(56) References Cited

U.S. PATENT DOCUMENTS

| | | | | |
|---|---|---|---|---|
| 10,029,685 | B1* | 7/2018 | Hubbard | B60W 30/146 |
| RE47,986 | E* | 5/2020 | Hubbard | G08G 1/0129 |
| 10,697,784 | B1 | 6/2020 | Li | |
| 10,803,525 | B1* | 10/2020 | Augustine | G06Q 40/08 |
| 11,699,309 | B2 | 7/2023 | Carver et al. | |
| 2007/0027583 | A1* | 2/2007 | Tamir | G07C 5/008 |
| | | | | 701/1 |
| 2011/0025483 | A1* | 2/2011 | Yano | G08G 1/168 |
| | | | | 340/436 |
| 2012/0101855 | A1* | 4/2012 | Collins | G06Q 40/08 |
| | | | | 705/4 |
| 2012/0123806 | A1* | 5/2012 | Schumann, Jr. | G06Q 40/08 |
| | | | | 705/4 |
| 2014/0046701 | A1* | 2/2014 | Steinberg | G08G 1/20 |
| | | | | 705/4 |
| 2015/0112546 | A1 | 4/2015 | Ochsendorf et al. | |
| 2015/0246676 | A1* | 9/2015 | Keren | B60W 30/146 |
| | | | | 701/93 |
| 2015/0279212 | A1* | 10/2015 | Otake | G08G 1/166 |
| | | | | 701/117 |
| 2016/0114807 | A1* | 4/2016 | Phelan | G08G 1/0112 |
| | | | | 701/70 |
| 2016/0125669 | A1* | 5/2016 | Meyer | G07C 5/0808 |
| | | | | 701/31.5 |
| 2016/0155277 | A1* | 6/2016 | Asada | B60C 11/246 |
| | | | | 701/70 |
| 2017/0057492 | A1* | 3/2017 | Edgington | B60W 40/08 |
| 2017/0287233 | A1* | 10/2017 | Nix | G08G 1/166 |
| 2018/0059687 | A1 | 3/2018 | Hayes et al. | |
| 2019/0019133 | A1 | 1/2019 | Allen | |
| 2019/0156150 | A1 | 5/2019 | Krishnan | |
| 2019/0289446 | A1* | 9/2019 | Kim | H04W 4/00 |
| 2019/0318620 | A1* | 10/2019 | Yang | G05D 1/0287 |
| 2020/0130688 | A1* | 4/2020 | Kline | B60W 10/11 |
| 2020/0286310 | A1 | 9/2020 | Carver | |

\* cited by examiner

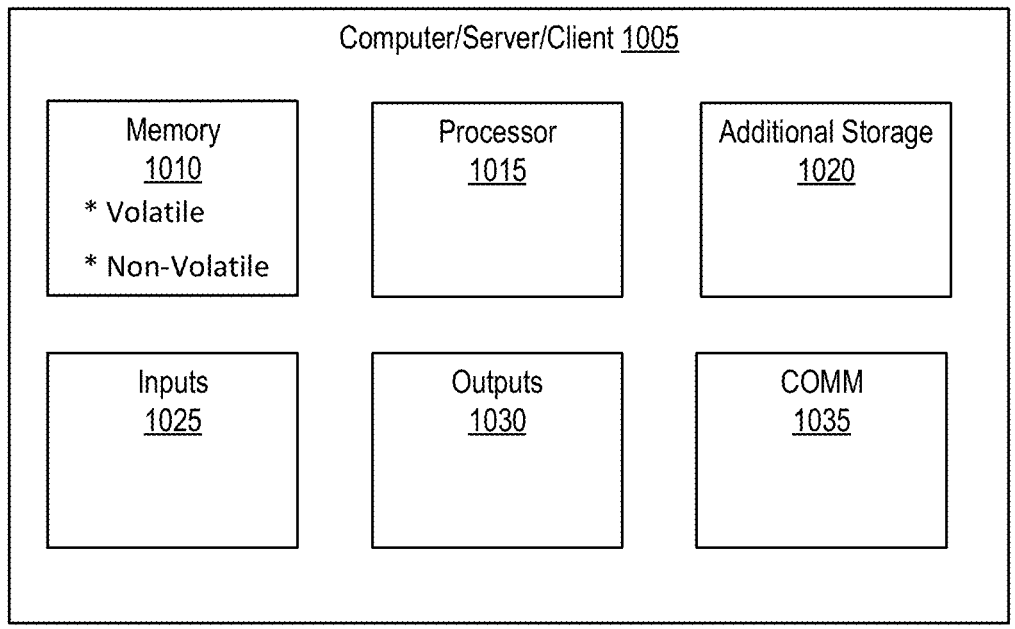
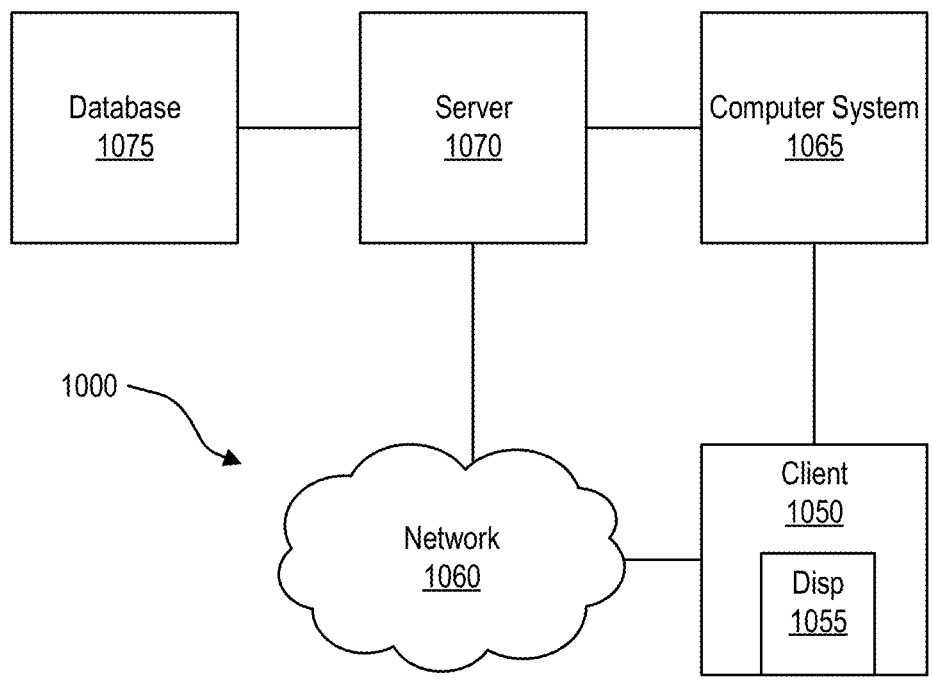
FIG. 10

VEHICLE OPERATION ANALYTICS, FEEDBACK, AND ENHANCEMENT

CROSS REFERENCE TO RELATED APPLICATIONS

The present application claims the priority benefit of U.S. provisional application No. 62/842,458 filed May 2, 2019 and is a continuation-in-part of U.S. patent application Ser. No. 16/103,441 filed Aug. 14, 2018, which is a continuation of U.S. patent application Ser. No. 14/687,099 filed Apr. 15, 2015, now U.S. Pat. No. 10,049,408, which claims the priority benefit of U.S. provisional patent application No. 61/979,972 filed Apr. 15, 2014, all of which are incorporated herein by reference.

BACKGROUND

Field of the Invention

The present disclosure generally relates to evaluating collected driving data to identify driving risks. More specifically the present disclosure is directed to mitigating identified driving risks.

Description of the Related Art

A Global Navigation Satellite System (GNSS) is a satellite-based geo-spatial positioning system in which a GNSS receiver device receives signals broadcast by multiple GNSS satellites orbiting the Earth, and, based on the signals from these satellites, is able to determine its own location. Common GNSS systems include the US-based Global Positioning System (GPS), the Russia-based Global Navigation Satellite System (GLONASS), the China-based BeiDou Navigation Satellite System (BDS), and the Europe-based Galileo GNSS.

Some vehicles include navigation devices with integrated GNSS receivers that may be used together with road maps stored on the navigation device to determine a current location of the vehicle within a city's road infrastructure and to assist the driver in determining how to arrive at a desired destination from their current location via the city's road infrastructure. These navigation devices may be built into the vehicle itself, as in a dashboard computer, or may simply be located within the vehicle, as in a driver's smartphone.

A category of insurance referred to as usage-based insurance ("UBI") has recently been gaining popularity as a way for insurance companies to more fairly allocate risk among their customers. Under UBI, vehicle usage data is shared, directly or indirectly, with insurance carriers, who then estimate risk based on this vehicle usage data and price insurance accordingly. At least in theory, UBI should benefit drivers whose vehicles are not driven as often and are therefore exposed to less risk. However, the data upon which UBI relies on is not always reliable and sometimes lacks context, leading to potentially unfair or inaccurate judgments as to allocation of risk. In particular, UBI is traditionally based on very simple tracking of distances traveled, as by an odometer. Such simple tracking information generally provides no insight into how safely the driver drives, in what environmental conditions the vehicle is driven in, or the condition of the vehicle—all of which impact risk. Failure to consider such factors limits UBI's usefulness and accuracy, and essentially treats safe driving identically to unsafe driving.

Additionally, UBI can in some cases present privacy issues in that more data is collected and shared about drivers and vehicles than ever before—some of which can be sensitive, such as location data from which an individual's location could be inferred. As increasingly strict privacy laws are increasingly put in place around the world, such data is risky to share widely without protection. Finally, UBI does nothing to assist drivers or organizations employing drivers to improve driving.

In short, there is a technological problem in that traditional vehicle analytics are inaccurate and insufficient to generate accurate heuristics for vehicle and driver behavior. There is a need for technological improvements in vehicle operation capture, interpretation, analytics, feedback, and enhancement.

SUMMARY OF THE PRESENTLY CLAIMED INVENTION

A method for automatic vehicle control modification may include receiving data regarding motion of a vehicle that includes location data and timing information, identifying a safety index associated with the vehicle, and identifying a speed of the vehicle from the location data and timing information. This method may also include identifying that the speed of the vehicle exceeds a speed threshold, the speed threshold based on the safety index. After the excessive speed has been identified, a command may be sent that results in the automatic reduction of the vehicle speed.

An apparatus consistent with the present disclosure may include a communication interface that receives data regarding the motion of a vehicle. Here again this data may include location data and timing information. This apparatus may also include a memory and a processor that executes instructions out of the memory to perform various operations. These operations may include generating a safety index based on the motion data and calculating a speed of the vehicle based on the location data and the timing information. These operations may also include calculating an estimated location of the vehicle based on the location data, the speed of the vehicle, and a current time. Furthermore, operations performed by the processor may include generating an offset based on the safety index and calculating an enhanced estimated location of the vehicle by applying the offset to the estimated location of the vehicle.

A second method consistent with the present disclosure may include receiving a first condition of a first vehicle from a first telemetric device carried by the first vehicle and receiving a second condition of a second vehicle from a second telemetric device carried by the second vehicle, where the first condition and the second condition are different. This second method may also include identifying a first safety score associated with the first condition identifying a second safety score associated with the second condition, and generating a command based on an identification that the second safety score is higher than the first safety score. This second method may also include transmitting the command to an electronic vehicle control system of the first vehicle that results in the first condition of the first vehicle being changed to correspond to the second condition of the second vehicle.

BRIEF DESCRIPTION OF THE DRAWINGS

FIG. 10 includes a schematic diagram illustrating a computing system environment in which the present technology can be implemented and operated.

DETAILED DESCRIPTION

Figure 1:
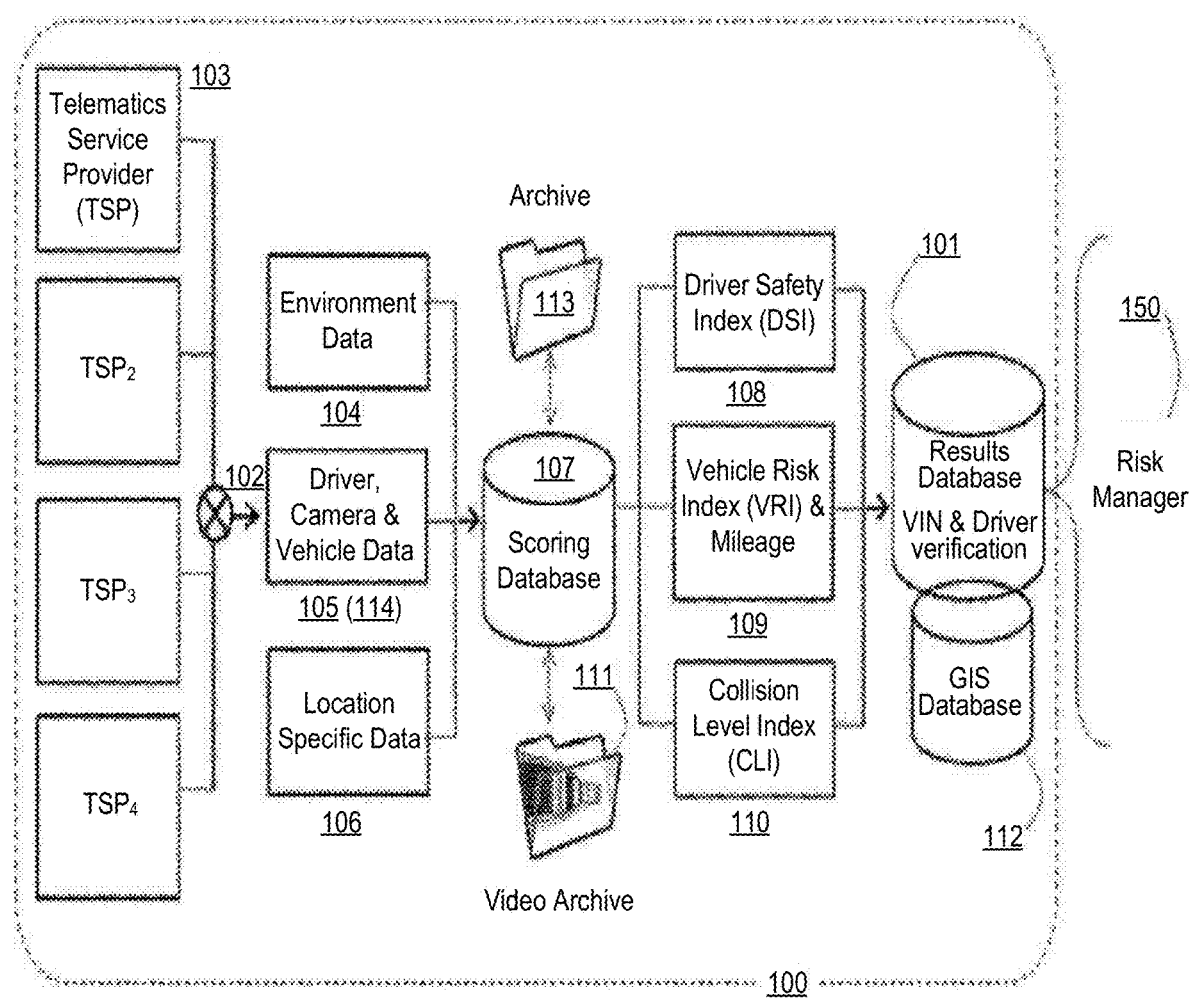
FIG. 1 illustrates a system that may collect data used to assign and validate driver or vehicle safety scores.

This patent application is intended to describe one or more embodiments of a number of method and systems. It is to be understood that the use of absolute terms, such as "must," "will," and the like, as well as specific quantities, is to be construed as being applicable to one or more of such embodiments, but not necessarily to all such embodiments. As such, embodiments of the described method and systems may omit, or include a modification of, one or more features or functionalities described in the context of such absolute terms.

Kinematic data characterizing movement of one or more vehicles is used to generate one or more safety indices scoring safety of a driver, of a vehicle, and/or of an environment. These safety indices may optionally be weighted and combined into a combined overall safety grade or index. The safety indices may be used to generate a personalized speed threshold or acceleration threshold for a vehicle and/or driver, to enhance accuracy of a location estimate for a vehicle, and to optimize a vehicle condition such as headlight or windshield wiper status.

Embodiments include a method and system for communicating connected vehicle data for risk management from real-time asynchronous sources, of different reporting intervals. A fleet of vehicles with dissimilar connected vehicle hardware, provided by different service providers, can be combined to form a risk management data network and risk transfer service for private passenger vehicles, shared transport and commercial vehicles. In addition, indexing methods allows for and anticipates the exclusion of blocks of private information for individual drivers. The methods provide for a means to keep individual driver, shared transport, or selective fleet vehicle information anonymous from the risk managers without impacting the integrity of the resultant safety systems or compromising onboard safety.

To clarify, these asynchronous data feeds are not transmitted with the same periodicity, or even governed by a common clock, as would occur in a synchronous data feed. The asynchronous method evaluates, peer to peer, data sets that have not been previously coordinated in any manner, with the exception of a common geospatial reference, and achieves the same indexed result as a synchronous method. The asynchronous method works by oversampling the environment for three orthogonal indices and constraining the possible data excursions for two with an apriori knowledge of the vehicles performance limitations. The resultant intersection of the three orthogonal indices is a singular, unique scored result which is therefore portable between reference frames (vehicles within a fleet or business class) or driven environments (rating territories). Because the driver is common within two of the solution sets, there are multiple pairs of indices where a driver can achieve the same overall Safe-Driving score and thus it is not correct to say an individual's driver safety index (108) is portable without the other two indices, vehicle risk (VRI) 109 and Collision Level (CLI) 110.

The subject matter of an embodiment is generally related to the development of a safe driving score for risk management and risk analytics purposes with intent towards transparency and portability. More particularly, the use of authenticated asynchronous data sets from the same driver of different vehicles from which data is accessible produces a quantifiable index that reduces a family of conceptual risk predictions to a single quantifiable, transparent and consistent score.

Although traffic safety generally reflects the consideration and integration of three components—the roadway, the vehicle, and the roadway user—the information needs of roadway users are very often neglected in traditional driving assessment computations by risk transfer practitioners. To improve the usability of said score and prevent compromising the privacy of the driver, a set of antecedents segment risks based on actual driving results without divulging location. An optional advantage of an embodiment lies in its ability to balance a priori knowledge of spatiotemporal constraint violations, with the a posteriori knowledge of sensor exceedances, near-collisions and collisions. The exceedances are defined as the extent to which the sensor signal and noise exceeded a threshold or limit. This quantification of severity in risk taking, not simply the frequency of the occurrences, enables apportionment of risk consistent with a driver's abilities, within a driving environment and for a defined vehicle from asynchronous vehicle and sensor data. An embodiment enhances safety and convenience by providing (1) the ability of vehicle safety systems to optimize the number of spatiotemporal constraint violations (such as in-vehicle real-time feedback when driving too fast for a given condition), (2) the ability to assure privacy when the driver agrees to share data with an entity or agency (both in the vehicle and on a mobile device), and (3) facilitating intra-vehicle portability of driver risk profiles to facilitate risk management and transfer.

A plurality of data-logging devices is used by motorists and motor vehicles on today's highways. The data (referred to as "log files") from these devices can be shown to be very predictive of risk in aggregate, and at an individual vehicle or driver level, regardless of whether the vehicle is itself connected, or the data comes from a mobile terminal communicating with an onboard device. A connected vehicle may collect and share homogenous, spatiotemporal (time and location stamped) data over a telemetry network in real-time. Despite the long standing capability to collect such time-series data, the ability to gather log files, normalize them with environmental conditions and vehicle performance, and evaluate driver behavior (e.g., as low-risk, versus high-risk) has been elusive to the risk management industry. While some methods have been suggested in other patents, none describe how to (1) maximize the accuracy of onboard hardware sensor data collection, (2) deliver onboard usable peer-based analytics and (3) analyze data from different vehicles having dissimilar sensors. In summary, an innovation of an embodiment described herein includes the asynchronous data delivery and collection methods for the same driver in different vehicles to achieve a normalized result.

An embodiment described herein provides a clear method to normalize the aforementioned heterogeneous, asynchronous data sources. These normalized results, when segmented by class of business for commercial risk management, or geographically for personal safety management, can be shown to have considerable value for both traditionally insured (guaranteed cost) and the self-insured fleet.

An embodiment uses a plurality of analytics (from different vehicles, sensor types, and sources) predicated on the existence of one or more Global Navigation Satellite System (GNSS) receiver (using, for example, the GPS, GLONASS, Galileo or Beidou systems) capable of time stamping spatiotemporal data. In turn this data, in a two-way exchange with server side generated risk variables, can provide contextually relevant and peer-based driver feedback thereby capturing the true ability of the driver to avoid collisions or risk exceedances.

An embodiment advances risk and vehicle management technologies by utilizing the combined intelligence of a larger off-board data set, deep-learning methods of event correlation and myriad nationwide real-time data (including but not limited to wireless transmission) sources to describe a predictive algorithm for dynamic risk rating based on variations in both the vehicle performance and driver score against the predicted norm for the environmental conditions. Further, a method of creating and rating the risk profile by the FAIR (forward-assessment of indexed risk) score method allows for dynamic changes in the quantity of driving data authorized by the "opt-in" policy assigned to the component data without invalidating the overall source. For example the insurer can still rate the risk even if one driver on the policy chooses to only share mileage related information and no locations, and another elects to share considerably more data. The absolute values of the driver score so computed remains only an input variable for insurance rating and thus a proxy, albeit ten times more accurate than anything used to date, for collision frequency. True driving behavior over time is dynamic, and it can be shown that resolving the data deficiency created by relative changes in behavior or risk tolerance can be predicted using three indices—Driver (skill) Safety, Vehicle (performance) Risk and Collision (frequency) Level. Dynamically mining variables to compute these indices results from a machine learning algorithm to detect changes in driver behavior, an important variation in the dynamic allocation of peril analytics. Localized comparative rating is the recommended embodiment of the FAIR score method and not the computation of an absolute driver score without location adjustments as previous methods suggest.

In summary, an optionally advantageous differentiator of the methods asserted and shown, to analyze asynchronous, heterogeneous data, regardless of the methods used for onboard analysis, data collection or similarity of data sources, are demonstrable predictive results which correlate very well with loss history over time. An important distinction of this three-index predictive analytics method is the ability to dynamically manage real-time changes in the risk profile of a driver, an advancement on traditional UBI risk allocation and underwriting, and described from here forward as a FAIR score.

Use of the FAIR Score describes and implies a method to underwrite or desk-adjust claims, based on the actual risk incurred relative to the real-time environment, and larger comparative, dynamically changing environment and population in the locale where the vehicle is being operated. This approach has great value because of its ability to produce predictive analytics for underwriting; more than just the risk of physical damage to a claimed vehicle, the predictive value can aid when adjusting rates for bodily injury, property and liability based on an intimate knowledge of the location and other vehicles in the area.

For a true usage based underwriting advantage, on any line of business, the system described here provides the ability to not only calculate but adjust the earned premium due based on a normalized score for the environment which varies in a non-linear fashion. Thus, earned premium, as a percentage of written premium, varies in a non-linear fashion with dynamically predicted risk acting as the driver for base rating model. An optionally advantageous aspect of the usage based method of underwriting lies in the existence of a process capable of gathering exposure information from a wide network of sensors, including video, both inside and outside the vehicle. Because of the nature of the FAIR score algorithms and the method described, it is not inherently necessary to synchronize the data received from sensors located outside a vehicle before the individual risk manager creates a model to quantify the risk using the three indices derived by predictive analytic methods described below herein.

Finally, to utilize the results of these methods may presume and may require the ability by the insurer to combine and analyze a statistically significant percentage of similar vehicle traffic (>5% of the all vehicles) from which the deviations from the norm can be computed. The normalization process produces a premium modifier, debit or credit, which when weighted with a FAIR score can be applied in lieu of the traditional static rating territory, to dynamically adjust the insured vehicle's risk transfer pricing.

A method of predicting risk from the method described herein does not attempt to define a final risk score, but instead provide a set of indices through predicative analytics that can be used by risk managers in at least one of two ways—(1) create in-house risk models for retained risk and (2) used directly by insurance underwriters to improve pricing precision.

FIG. 1 illustrates a system that may collect data used to assign and validate driver or vehicle safety scores. The system 100 of FIG. 1 includes onboard devices configured to provide telemetric data such as telematics service providers ("TSPs") 103, that collect driving data 105 from individual vehicles or fleets of vehicles. Alternatively, TSPs 103 may be third-party providers of telemetric data, which are generated by units supplied by such providers. Driving data 105 may include driver identity, position, velocity, yaw/pitch/roll, lateral, vertical and longitudinal acceleration/deceleration, heading and/or time. Additionally driving data can include driver inputs such as throttle position, rate of change of steering commands and use of automation such as ADAS (advanced driver assistance systems). The driving data is collected by TSP hardware that may be onboard vehicles (not shown). The term "vehicle" for the purposes of the discussion herein means any propelled vehicle regardless of the medium on which it travels and/or its driver controls. Additionally, a "vehicle" may include an object carried by another vehicle. The onboard hardware may include cameras, sensors, factory installed telematics equipment, an after-market telematics device, a mobile device (such as a phone or tablet), and the like. Using these various sensors, including their multiple GNSS sensors, weighted based on differential readings from peered devices, creates a filter for vehicle dynamics which can be used to cross correlate asynchronous location reports. The resultant driving data not only helps identify a driver associated with driving data but also provides a smoothing function for the normalization of the data. In such embodiments, the hardware may include an aftermarket biometric sensor, a mobile device (such as a phone or tablet), and the like.

The system 100 gathers data for use by a Driver Scoring Processor/Database 107 in calculating a Driver Score to be included in the Driver Scoring Processor/Database. The Driver Scoring Processor/Database 107, which may be referred to herein simply as database 107, may be functionally equivalent or at least similar to server 1070 or computer system 1065 discussed with reference to FIG. 10. The driving data 105 is forwarded to the Driver scoring database 107 along with environmental data 104 and location specific data 106 via communication interfaces/devices, such as a modem or other conventional network-connection device, as generally indicated in FIG. 1 by arrows. The location specific data 106 and/or the environmental data 104 may be obtained from government data sources such as local Department of Transportation ("DOT"), National Oceanic and Atmospheric Administration ("NOAA") and National Highway Traffic Safety Administration ("NHTSA") data. The environmental data 104 may include data describing one or more conventional weather parameters associated with the location of the vehicle, such as, for example, temperature, relative humidity, atmospheric pressure, precipitation type, precipitation level, etc. The location specific data 106 (from one or more GNSS sensor, or other radio telemetry system) may include geometry of terrain, speed limit of the road, vehicle to infrastructure ("V2I") information, and vehicle to vehicle ("V2V") data exchanges. The Driver scoring database 107 uses a backwards correlated learning method of mining temporal data (described below as temporal data mining using deep learning techniques) to generate a driver safety index 108, a vehicle risk index and Mileage 109, and a collision level index 110. A fundamentally unique aspect of the method is the creation of indices using these data mining techniques for the detection of events correlated with the three indices [driver safety (DSI) 108, vehicle risk (VRI) 109 and Collision Level (CLI) 110] (see detailed description below of indices determination).

The deep learning method, or mining method, described herein begins with a fundamentally different method of data search. Rather than a forward convolution scheme, the method searches backwards from the point of an exceedance for similar data patterns to correlate and then normalizes these patterns for vehicles of, for example, equivalent weight, driving environment and regional profile to derive weights to apply to each of the three indices (DSI, VRI and CLI) at the vehicle level. On roads where there is insufficient data on collisions, speeding and incidents to provide a common reference for the CLI, a convolution scheme based on historically similar peer vehicles (same weight class and territory). These indices are then summed for a common group of trips, or period of time using a time weighted average (proportional to exposure) to produce the fleet level score stored, along with the individual scores, by VIN number in the results database 101, again using a temporal database structure for storing and summing these elements, to bias the results to the most recent events, or time series data because it has been shown that recent events are much more predictive of risk factors than historical patterns when the pattern sequence is changing. For example, there may exist a braking pattern for an individual driver that appears to vary from the norm for a certain vehicle type by a trivial amount until detection of that pattern with greater frequency in a new geographic region such as on a sharp incline within a city. The ability to train the index to add this pattern and reverse mine the data set and see the time series associated with the pattern adds an optionally advantageous pattern for a particular driver to allow detection of the overall change in behavior that ultimately is used to quantify risk using the trip to trip variations shown in FIG. 4. Stated slightly differently, driving habits in the same class of vehicle on a rural road, out of traffic, may be low risk and the same habit in city traffic with steep terrain could be very high risk.

Due to the complexity of identifying and coding events recorded on audio or video records the reverse pattern recognition method, described above, provides a very effective method of searching for specific exceedance events, and then by going back in the data in reverse chronological order similar events can be identified for inclusion in the index. Without some a priori knowledge, or learning, video systems historically miss over 90% of the driving patterns unless there is a catastrophic result, such as an actual collision. Overall the results obtained by the FAIR score method have been shown to improve the effectiveness of driver training by cutting in half the number of exceedances and the resulting frequency of corrective actions required in over 100 test fleets (a sample population of 1,320 drivers).

Once the risk indices (DSI, VRI and CLI) are computed they are exposure weighted based on time (time in territory) via geographic information system (GIS) data computations 112 and stored both at the vehicle level and at the fleet level in the results database 101. The nomenclature derives from the identification methods used by the risk managers 150 to query the database. Underwriting processes may begin with the identification of the vehicle and the driver to be insured. Therefore these are the values used to identify the fleet participants for the policy rating.

One or more embodiments, and there are multiple methods to aggregate the driving data 105 shown in FIG. 1, may be specifically architected to accommodate the use of many different TSPs, their respective hardware components (sensors), and reporting rates. Some UBI models depend on identical, synchronized devices and/or sensors with nearly similar reporting rates. In contrast, the embodiments described herein allow for the use of data from different hardware platforms (as found in different makes and models of vehicles), different vehicle types (including on and off-road vehicles), different vehicle performance capabilities, different vehicle operating modes (autonomous, semi-autonomous, and manual) and different methods of making the data personally identifiable. For example, the driving data 105 may be collected (i) by factory installed telematics equipment and identify the driver by manual input by the driver of his/her identity entirely using the installed electronics, (ii) by an after-market telematics device using an aftermarket biometric sensor configured to identify the driver, (iii) by a mobile device (such as a phone or tablet) in real-time or after the fact with the driver identity derived from his/her association with the mobile device or (iv) a hybrid approach that combines any, or all, of the above data collection and driver identification methods.

Figure 2:
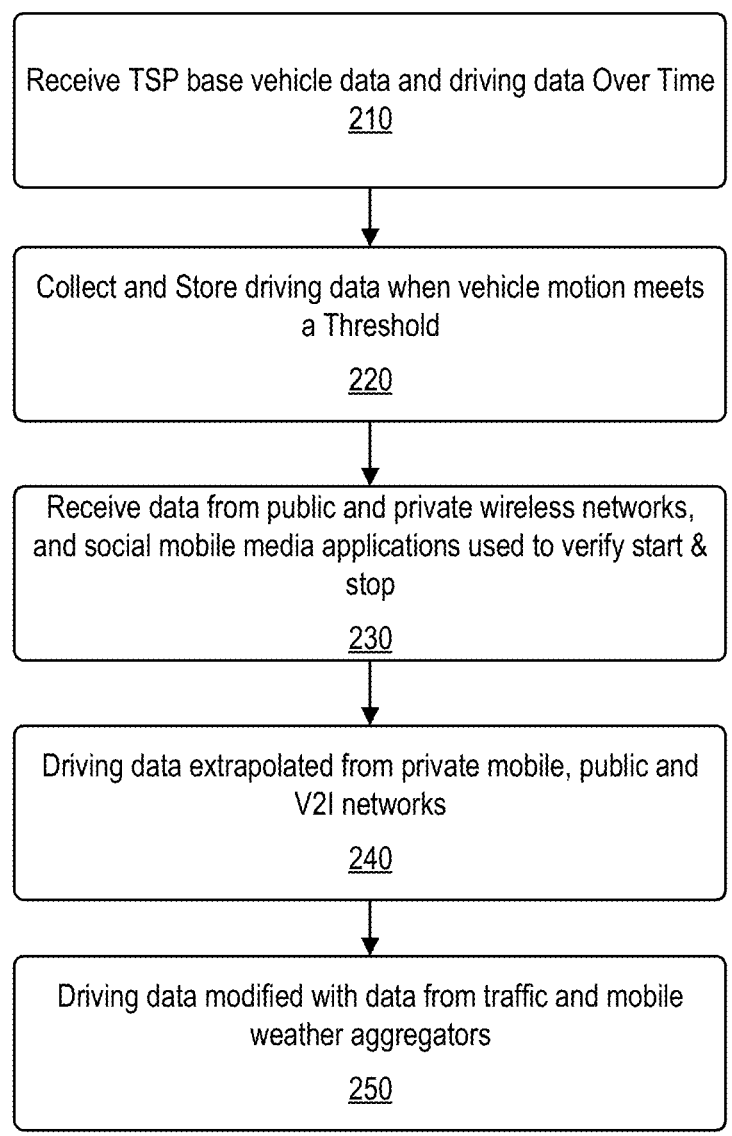
FIG. 2 is a flow diagram illustrating a sequential approach to capturing data from which safety scores may be generated.

FIG. 2 is a flow diagram illustrating a sequential approach to capturing data from which safety scores may be generated. Data collected in FIG. 2 may include driver information, vehicle identifying information, camera image data, and infrastructure data. As discussed with respect to FIG. 1, the captured data 105 may include data about drivers, such as a name of a driver, a phone number of a driver, a username of a driver, an online service account username of a driver, an email address of a driver, a mailing address of a driver, or other driver identifiers. The captured data 105 may additionally or alternatively include vehicle data, such as speed, velocity, yaw, pitch, roll, linear acceleration or deceleration, non-linear acceleration or deceleration, lateral acceleration or deceleration, longitudinal acceleration or deceleration, lift, vertical acceleration or deceleration, heading. The captured data 105 may additionally or alternatively include sensor data from sensors onboard the vehicle in question, such as GNSS receivers, proximity sensors (e.g., laser rangefinders, radar transceivers, sonar transceivers, LIDAR transceivers) identifying distance from the vehicle in question to nearby vehicles/obstacles, visible light cameras onboard the vehicle, infrared cameras onboard the vehicle, night vision cameras onboard the vehicle, or combinations thereof. The captured data 105 may additionally or alternatively include sensor data from sensors such as any of those discussed above but onboard other nearby vehicles, such as vehicles in the same area as the vehicle in question or within a particular distance of the vehicle in question. This represents an example of a vehicle-to-vehicle (V2V) sharing, optionally with one or more servers in between. The captured data 105 may additionally or alternatively include sensor data from sensors such as any of those discussed above but onboard roadside infrastructure such as traffic cameras, weather stations, overhead RFID readers/scanners, traffic lights, speed capture sensors, lane markers, streetlights, street signs, parking meters. This represents an example of a vehicle-to-infrastructure (V2I) sharing (or infrastructure-to-vehicle sharing), optionally with one or more servers in between. The captured data 105 may additionally or alternatively include environmental data such a data describing weather, road conditions, time zone, time of day, exact time—some of which may be from one or more of the above-listed sources, or may be provided via network servers and/or databases, such as those associated with a weather service or a traffic mapping service.

FIG. 2 begins with step 210, where vehicle base data and driving data are received from or collected by one or more telematics service providers (TSP) or TSP devices. This TSP data may be received at predetermined time intervals, for example at time intervals of less than 30 seconds to 2 minutes in length. In instances when the TSP data is scored on-board (e.g. by a computer located at a vehicle), the score can be summarized and provided for an entire trip (Engine On to Engine Off). In instances where driving scores are calculated by a computer remote from a vehicle (off-board scoring), such off-board scoring may require transmission of position, velocity, and time (PVT) data to the remote computer. In certain instances upon detection of predetermined threshold levels of change in such TSP data such as, for example, when on steep grades (e.g. greater than 30 degrees), when speed change by more than threshold amount (e.g. by at least 4 mph —up or down), or when lateral acceleration forces exceed a threshold level for a designated span of time (e.g. 400 mg for more than 100 mS), such a meeting or exceeding of a threshold level may result in a driver safety score being generated. In either instance, collected driving data may be stored whenever vehicle motion changes by a threshold amount in step 220 of FIG. 2. Such data may be collected by any type of computing device, for example, an onboard computer or a personal mobile device (such as a cell phone).

For the application of FAIR scores to regulated fleets with commercial drivers, Driver Fitness may be monitored. For example, sensors may collect driver heart related data (an electrocardiogram—EKG or heartbeat rate) and blood glucose levels that may be stored in the Driver scoring database 107 of FIG. 1. This data may be used to identify the driver safety index 108 of FIG. 1. Unique to an embodiment of the FAIR score method is the aggregation and mining of all data sets from various networks prior to the application of the location specific data 106 and the environmental data 104, within the database. Of particular importance to regulated fleets is the segmentation of data in the scoring database 107 with attention to privacy settings (illustrated in FIG. 3). After step 220, data regarding driving conditions or locations may be received from public or private networks in step 230 of FIG. 2. Such public or private networks may include social media sharing sites or data collected from V2I networks. Such information may be received as a vehicle is driven from a starting point to a destination (stopping point) along a roadway or route. Next in step 240 of FIG. 2, this collected data may be used to extrapolate or calculate a score for a driver.

As such, data collected from each of the different TSP data sources, may merge collected driving data 105 into scores and that data may be stored in the single scoring database 107. In certain instances, this data may be normalized with the externally gathered environmental data 104 and the location specific data 106 in step 250 of FIG. 2. Note that this environmental data and location specific data may have been received from one or more GNSS sensors external to the vehicle. Among the unique attribute of this merging process is the fact that it's done in reverse chronological order. From this data the system 100 may calculate the three indices: (1) the driver safety index (DSI) 108, (2) the vehicle risk index and mileage index (VRI) 109, and (3) the collision level index (CLI) 110. Each index 108-110 has two inputs (i) predictive components of the three data streams (namely, the driving data 105, the location specific data 106, and the environmental data 104) and (ii) the predictability of collision, incident, or other claim worthy event (such as a broken windshield or hail damage) and one output rating variable that is exposure weighted and fed to both the results database 101 and the GIS database 112 as the final FAIR score, and used by the risk manager 150. As such, data collected in steps 210, 220, and 230 FIG. 2 may be used to identify a DSI, a VRI, and a CLI using a series of calculations using data collected (aggregated) by individual TSPs, from vehicle motion sensors, and data received from public or private networks.

In such instances, driver and vehicle data may be coalesced from data received via wireless network 102. In addition to identity verification, an account key passed from the verification process in the results database 101 ensures that only agreed-upon data elements are passed (trip preprocessor) to driving data 105. Following this pre-processing step, the scaled data is adjusted for Environmental Data (such as weather conditions) 104, and Location Specific Data (such as local free flow traffic speed or posted speed information) 106. From within the trip scoring database 107, smoothing functions (described below herein) are used to deduce variations between vehicles, temporal data on the condition of the vehicle (weight, load status, tire pressure, visibility, etc.); condition of the road (moisture, surface temperature, dry or otherwise); road geometry (curvature and inclination); spatiotemporal traffic density data; weather and lighting conditions; known hazard areas; potentially fraudulent driving data and so on. When sensor data on board is available, either biometric or camera, the vehicle independent variables such as condition of the driver (e.g., drowsy or alert), and focus of the driver's attention (e.g. forward or distracted) the driving data (105) can also be adjusted before computing a trip level score within the scoring database 107. The trend of these adjustments, by vehicle, provides a trip to trip variation measurement. By monitoring the trip to trip variation of these scores with a process also running in the scoring database 107, high risk drivers and vehicles are able to be independently identified.

The system 100 may offer a risk manager a series of options in the underwriting of a vehicle. The VIN and Driver verification, in the results database 101, goes beyond collection of driving scores and raw data to the implementation of several levels of data that can be used to simply validate existing rating variables for an automated underwriting system, such as mileage or time of day; to the modification of the self-reported mileage and variables for equipment or safety credits in an underwriting system based on scheduled debits and credits; or as is often found in larger fleets, use of the three indices (driver safety, vehicle risk and Collision) in an existing filed rate, to a full loss rated underwriting regime. In all three scenarios the existence of the VIN and Driver verification process, in the results database 101, provides a real-time update on the operation of the telematics system and the actual mileage for the risk manager at any time during the policy period for the assessment of earned premium and changes in risk profile.

Personally identifiable information (PII) and location data received from the TSPs 103 may be only passed to the risk manager 150 by the database API if such data has passed authentication key checks performed locally within the verification database 101. By doing the process checks as part of the service, the system 100 can process thousands of vehicles simultaneously. In an embodiment, performing the identify verification after the data has been changed to the correct units and entered into the scoring database 107 may reduce the throughput of the system considerably.

A further purpose of the VIN and Driver verification in the results database 101 is to provide to third party risk managers only that data approved by the vehicle owner (usually also the business owner, or the individual insured).

Figure 5:
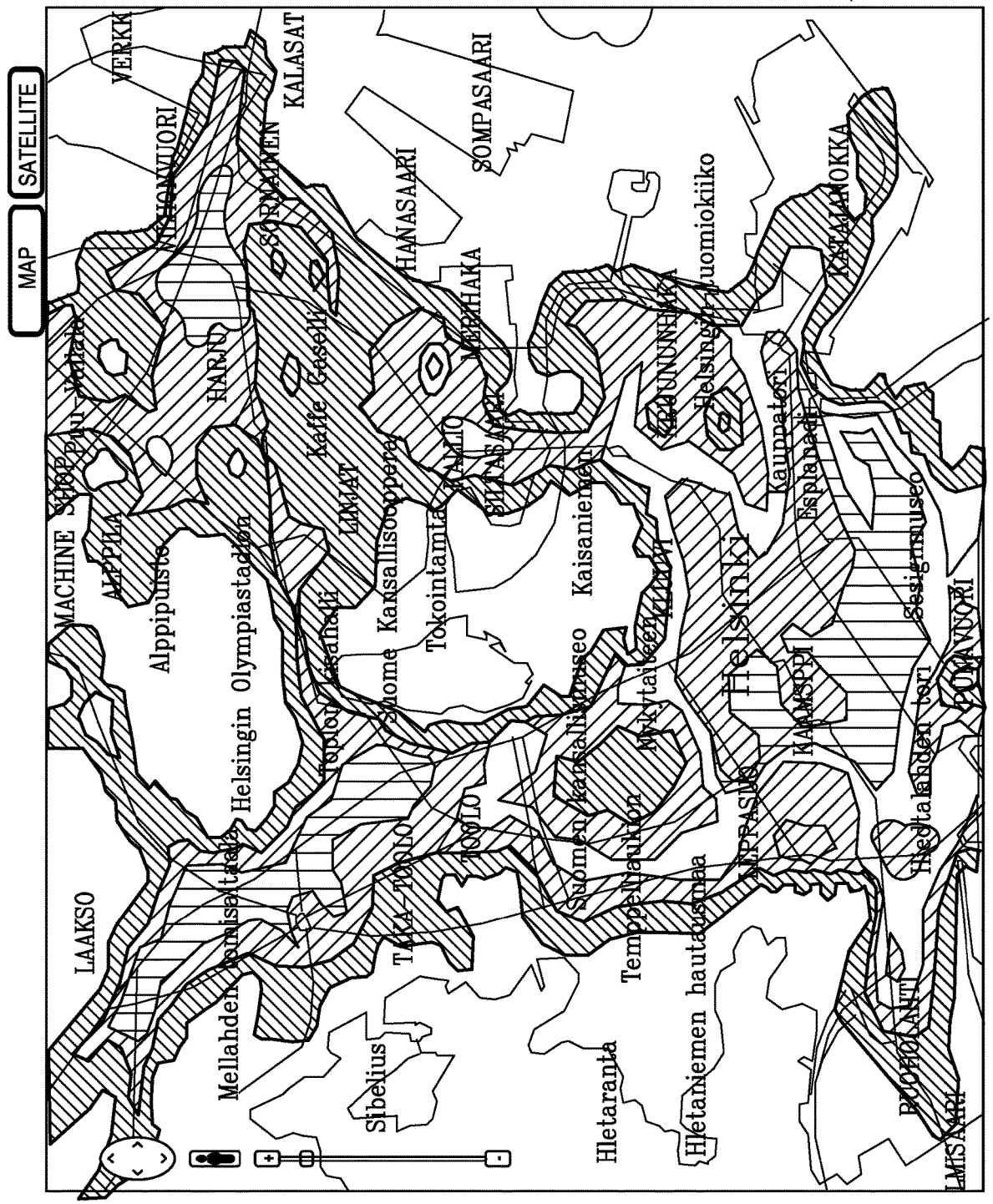
FIG. 5 is a heat map illustrating concentrations traffic along various roadways.

For the simplest fleet underwriting operation, the results database 101 and a "heat map" illustrated in FIG. 5 showing actual mileage and radius of operation for the vehicles, computed from the root mean square (RMS) value of trips, with seasonal and daily variations provides an ability to improve accuracy in rating by 150% or more. Such a map-based algorithm may, in an embodiment, require that the GIS database 112 be included for exposure computation purposes in the system 100. For such a simple approach, it has been shown that the results database 101 is required to correctly weight each trip with a safety index. Without verification, such as a biometric authentication, or similar method, the accuracy of the underwriting decreases. For claims analytics, it is also important to know the identity of the driver for bodily injury claims. Experience has clearly shown significant differences in the soft tissue damage caused by a low or high impact collision simply based on body type and physical stature.

A well understood principal of underwriting states that identifying vehicular-specific perils requires a fundamental understanding of exposure. The most commonly accepted method of establishing exposure is to have an insured vehicle provide mileage traveled or daily radius of operation. When combined with time of day and geography of operation (including road type), the vehicle produces and provides risk assessment variables of value to the risk manager 150. Risk managers with access to the spatiotemporal data and the referenced indices can compute a time weighted average risk metric for the more accurate insurance rate for the described exposure and thus price the policy more accurately for an individual risk in motion. One embodiment of this method, without computing a FAIR score for the fleet, includes a simple structured database of mileage and time of day that can be queried by knowing the VIN from the results database 101. Use of the technology requires little investment of time or resources, and no changes to their current filed rates.

As the risk managers become more facile with a particular implementation of the method for their segment of the population, or local region, they will determine which factors to weight or de-weight in their own risk models. These factors from the scoring database 107 are divided into their component parts for a comparative, not absolute, score which the system 100 normalizes as an index. As mentioned above, these indices include (i) the driver safety index 108, (ii) the vehicle risk index and Mileage 109 (indexed based on a comparison of all mileage reports for similar classes of business, or geographic region), and (iii) the collision index 110. The collision index 110 is applied to adjust for dynamic changes in driving behavior that can be very predictive of collisions for certain age groups and individuals with known medical conditions.

Within the scoring database 107 some of the factors can be determined with the driving data 105 from within the subject vehicle or surrounding vehicles, while others may be determined from the environment data 104 (e.g., obtained from sensors such as weather sensors on vehicles sharing the same environment) that can be used to alert a driver to changes in a road condition that will dramatically change the values of the trip vehicle risk index 109 and the collision index 110.

FIG. 1 illustrates an embodiment of the data flow through the system 100 for one or more vehicles, in conjunction with a commercial auto or fleet underwriting method. As the population of connected vehicles increases, among individual vehicle owners, the same method can be applied; it can use an embodiment that clusters the insured in fleets by risk factors most likely determined from mobile telephones, public networks, and social media data. This embodiment and data available from distracted driving work envisions the clustering of these virtual fleets by the collision index 110. (See description of data clustering methods below).

Figure 4:
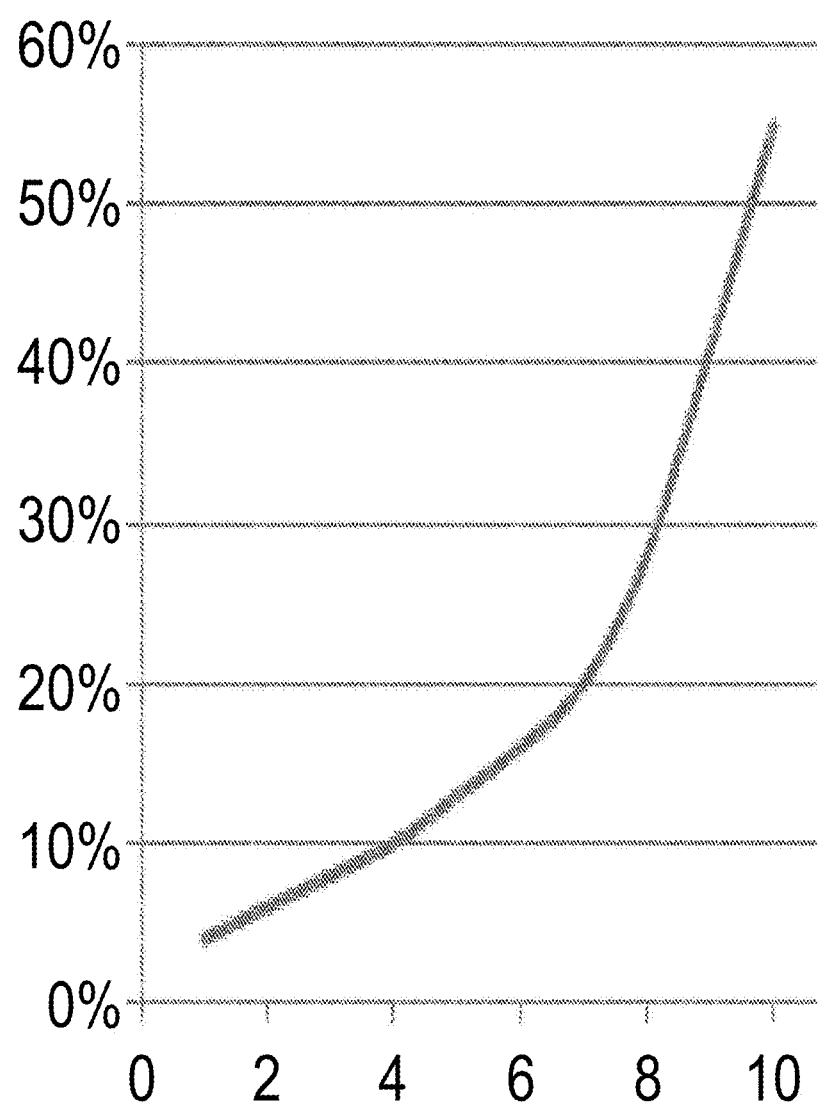
FIG. 4 is a graph illustrating percentages of trip to trip variation with respect to quantifying risk.

Over a large group of connected vehicles, usually understood to mean at least 5,000 or more, the method can demonstrate the ability to produce Driver, Trip and Collision indexes without having a perfect data set from each vehicle. In FIG. 4 the method demonstrates that, for private passenger vehicles, the actual trip to trip score 107 variation over 12% is expected for 50% or more of drivers.

The result of the FAIR score method, over previously disclosed methods, is the segmentation of the vehicle risk index 109, entirely separated from the driver safety index 108, which should correct to less than a 5% standard deviation for the top four or more decile for most segmentations of risk. Commercial Vehicle Insurers when comparing these results with their own claims-frequency results will be able to validate the following example observations. As the standard deviation of the driver's trip to trip score increases above 20% the Collision Level index increases by at least 100%. For heavier vehicles (>16,000 lbs GVW) the standard deviation among the top 50% of drivers is considerably smaller and the Collision Level index also increases considerably less. A standard deviation in trip scores of more than 30% correlates very strongly with a collision index above the 50th percentile and therefore predicts collisions at 5× the normal rate. The claims rates are not universally higher because many of these collisions are a series of low severity, low speed impacts. The system 100 posits that given the underlying scores and normalized index, Connected Vehicle Insurers can predict risk for a vehicle in motion given a driver's behavior based on mileage, environment, and location, and independent compute risk for the vehicle in motion based on equipage, load, or maintenance condition. In an embodiment, the system 100 is only applicable to a vehicle in motion. Although the sensory inputs may be the same for the vehicle risk in the static case for the local environment, the inputs for injury profile and peril analytics for the driver are not predictive with the method or environmental factors identified here.

Another embodiment of the FAIR score would allow the commercial vehicle insurers to access the raw data and compute within their own models each decile for desired geographic regions, demographics and classes of business; and normalize these results using aggregate and anonymized values for all the regional vehicles in a particular business class, or other desired anonymized, custom groupings of vehicles within a demographic.

Using any of the described or similar methods, the policy holder gains the capability to secure individual data elements, scoring parameters or types of data (e.g., data related to a particular collision).

Figure 3:
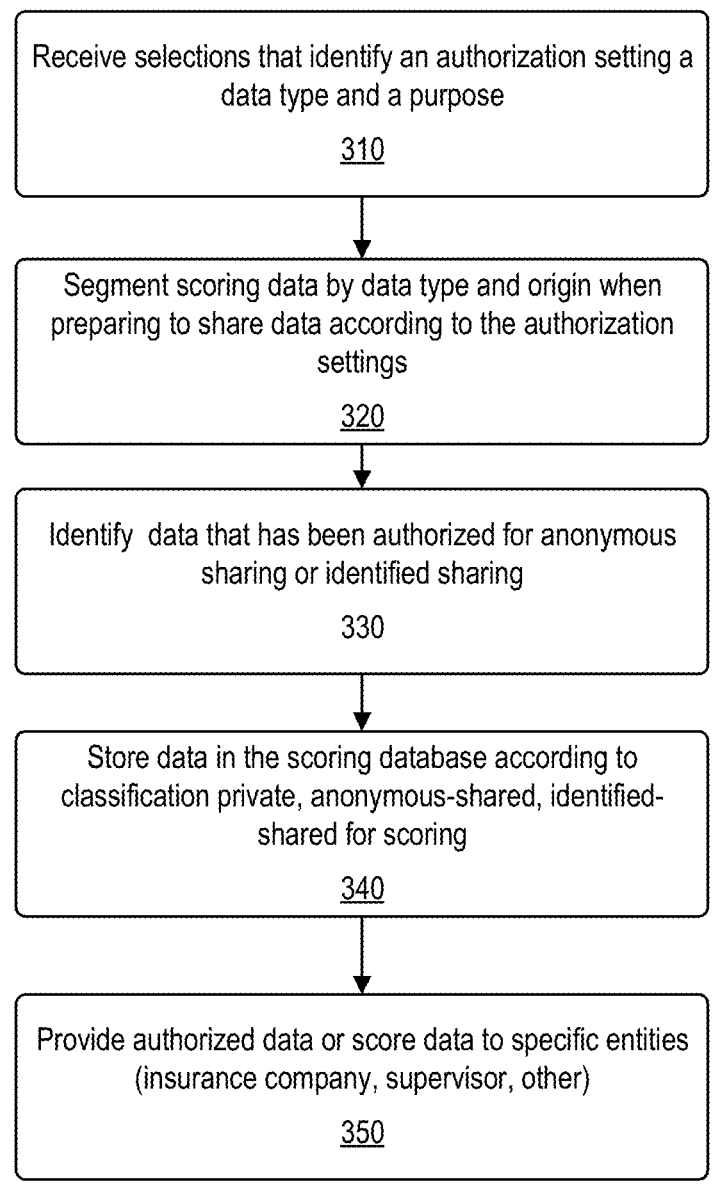
FIG. 3 is a flow diagram illustrating processes for segmenting data into categories of shared data and private data.

FIG. 3 is a flow diagram illustrating processes for segmenting data into categories of shared data and private data. As such, methods and apparatus consistent with the present disclosure may configured to share certain data to minimize insurance costs and not share other data to preserve privacy of a driver. The steps of FIG. 3 are steps by which a user might segment his/her data to restrict its receipt by an insurance company. More specifically, FIG. 3 is a flow diagram illustrating a simultaneous process for the verification of data to be shared either as identifiable, anonymous data, or not at all (private data based on a "user key" authentication process. Such an authentication process may be initiated by the process 100 of FIG. 1. This process may allow a user classify data into one of three basic categories—identifiable (shared), anonymous (shared), or private (not shared). The steps illustrated in FIG. 3 also allow the policy holder to provide different privacy settings for the different drivers on the same vehicle provided the vehicle is identified by VIN or serial number.

FIG. 3 begins with step 310, where selections are received that identify authorization settings and corresponding types of data that may be shared for different purposes with entities such as an insurance company or a supervisor. These authorization settings may be classified as 'identifiable-shared,' 'anonymous-shared,' and 'private.' In certain instances these selections may identify that data that can be shared with a supervisor and may identify a driver's identity can be shared with the supervisor. These settings may also identify that data can be shared with an insurance company or identify that data shared with the insurance company be anonymous (e.g. not identify the driver). Next in step 320 of FIG. 3, collected data may be segmented into the different classifications by data type and data source (origin) according to the authorization settings set in step 310 of FIG. 3. After step 320, data that has been authorized for anonymous sharing or identified sharing may be identified in step 330 and then the data segmented in step 320 may be stored in a scoring database in step 340 of FIG. 3. This stored data may identify a respective classification of private, anonymous-shared, and identified-shared. The data stored in step 340 may then be used to calculate driver scores or indexes (e.g. DSI, VRI, or CLI). Raw data, scores, or calculated indexes may then be shared to specific entities (e.g. a computer of an insurance company or a supervisor) according to the authorizations set in step 350 of FIG. 3.

Methods consistent with the present disclosure may include a detailed method for constructing, normalizing and displaying scoring indices for particular risk or cumulative risk factors. Table 1 shows that collected data may identify by vehicles by a vehicle identification number (VIN) that may be stored in the results database 101 of FIG. 1. This stored information may include a fleet or group of VINs, or by include data collected for an entire group of businesses. The information included in table 1 may be stored for later distribution to internal or external risk managers 150 of FIG. 1.

FIG. 4 is a graph illustrating percentages of trip to trip variation with respect to quantifying risk. FIG. 4 includes a vertical axis of percent variation and a horizontal axis of risk (0-10). FIG. 4 illustrates that a low amount of variation corresponds to a low risk and a high amount of variation corresponds to a higher risk. Note that a 1% variation corresponds to a risk assignment of 1, a 10% variation corresponds to a risk assignment of 4, a 40% variation corresponds to a risk assignment of 8, and a 55% variation corresponds to a risk assignment of 10. Note also that the variation-risk assignment curve of FIG. 4 indicates that risk assignments increase geometrically as a calculated variation increases linearly.

Table 1 illustrates an embodiment of a sub-method consistent with the present disclosure. That data of table 1 may be automatically collected and be stored in a database in real-time or in near-real-time. As such real-time mileage may be collected such that an actual radius of operation may be identified. The commercial vehicle insurer wishing to use their existing filings, or program insurance business with less than 1,000 vehicles, can use a sub-set of the method. This sub-set can be applied by assessing only mileage and radius of operation. In particular, table 1 illustrates a collection of vehicle data that includes VIN number, odometer readings, dates, times, annual distances travelled, radii of operation, and photos.

TABLE 1

| Vehicle Data | | | | | |
|---|---|---|---|---|---|
| VIN | Odometer | Date/Time | Annual Mileage | Radius of Operation | Picture Available? |
| 1C6RD7KTCS335395 | 84,685 | 2/14/2014 1905 GMT | 18,255 | 241 | Yes |
| 1GKET63M882174353 | 103,578 | 2/14/2014 1908 GMT | 28,467 | 488 | Yes |
| 3FADPOL33AR361555 | 64,532 | 2/14/2014 1901 GMT | 31,548 | 391 | No |
| 1FMCU9D72AKC59524 | 86,214 | 2/14/2014 1915 GMT | 27,176 | 264 | No |
| 1FMCU9DG2BKB46819 | 112,981 | 2/14/2014 1927 GMT | 24,913 | 303 | Yes |
| 1GEK63M882174353 | 88,211 | 2/14/2014 1915 GMT | 29,345 | 361 | No |

FIG. 5 is a heat map illustrating concentrations traffic along various roadways. FIG. 5 identifies locations where higher traffic levels are identified using a black color and where lower traffic levels are identified using a gray color. The heat map of FIG. 5 shows the concentration of traffic and vehicle operations around a specific area of defined risk relative to the normal operation of a similar traffic in the same geographic area. For the early adopter of the methods, a visual representation provides the risk manager easy access to the data without the integration of the index directly into the rating engine of the insurer. Not shown in the graphical version of this embodiment is the use of V2I and other hazardous road information to dynamically adjust the peril analytics around the zones of risk. Unlike traditional static maps drawn by zip code in underwriting models, the method provided produces a virtual map of each index 108-110 computed for geocoded regions and stored in the GIS (spatial) database 112 to provide a better assessment of the total risk at any given time. An additional aspect of the present subject matter and index approach is the clear delineation of risk associated with the collision level index 110 for the driving situation (e.g., rush hour deliveries, congested parking lots and driving in hail, etc.) from that of a driver (e.g., aggressiveness, impaired vision, fatigue and other debilitating conditions) in a driver safety index 108.

An optionally advantageous benefit of the FAIR score method, from the insurance carriers' perspective, will be the ability to determine the peril associated with the growing trend of shared vehicle usage and ownership. Further, in the case of ride-sharing liability, with a known distance of travel and vehicle risk index 109, known driver safety index (and identity, when known) 108, a collision level index 110 will reduce the risk transferred to the risk manager by utilizing the connected vehicle insurance method. Another embodiment might be the method of setting rates for car sharing in Connected Vehicle underwriting; a process better visualized as 'reverse-underwriting' or the process of matching a risk to a rate, rather than the traditional rate for risk model. In the case of new drivers for a car sharing operation, the method can use the large data set in the scoring database 107, and the computed vehicle risk index 109 and the collision level index 110 to quickly arrive at a driver safety index 108, usually within a single trip. The FAIR score method solves many complicated issues for current commercial operations attempting to insure, or self-insure traditional, semi-autonomous and autonomous operations. The portability of the FAIR score also makes it useful for clients that regularly move between personal lines and commercial policies such as the case with Transportation Network Companies (TNCs). For the risk managers at these operations, this rapid assessment process reduces collisions and increases the effectiveness of training programs. Further this process can be utilized to adjust exposure for drivers who increase their Collision Index by electing to drive manually, rather than take advantage of the semi-autonomous or autonomous driving features of their vehicles. As a final consideration, some businesses will inherently have a higher collision index due to higher risk operations within high traffic zones of the city, carry hazardous cargo or operations during times of the day (such as the late afternoon) when incidents are higher. The ability to track both the absolute value and the variation of the index from trip to trip provides the Connected Vehicle Insurer the ability to improve their rating models with clear underwriting guidelines, and driver training criteria.

In the case of completely autonomous vehicles where 100% of the exposure for the vehicle risk index 109 and Collision Level index 110 may be allocated to the vehicle manufacturer the Connected Vehicle Insurer has a nearly indisputable opportunity, especially with the potential for video support 114, due to the method, to subrogate any insurance claim by either the insured, or another claimant. In addition to underwriting decisions, the ability of insurer to evaluate the driver safety index 108 and associated limitations of the vehicle risk index 109 in real-time can also be used to influence other risk control actions.

For the purposes of insurance claims management by the Connected Vehicle Insurers the system 100 (as shown in FIG. 1) receives high resolution crash data that may be part of data 105 from onboard systems and external systems monitoring the general environment of the vehicle, such as real-time vehicle weather stations, roadside weather stations, onboard vehicle cameras and roadside safety cameras. For confidentiality purposes, no more than 20 minutes of data 105 (or video data subset 114) may be included in an embodiment of the system and combined with a plurality of data for the claims file. Due to security procedures of the system 100, the driver may have the right to withhold any individual data set from the claims file, including but not limited to environmental data, health data, vehicle maintenance and drive behavior data.

Description of Temporal Data Mining Using Deep Learning Techniques:

Most telematics platforms today, including mobile phones, do not adapt to the driver's usage patterns, driving style(s), weather conditions, traffic or interaction with the vehicle. Rather, the person(s) adapt to the capabilities of the vehicle. To achieve a vehicle neutral driver safety index 108 and vehicle risk index 109 requires deep learning based on a priori knowledge of how normalized driver data sets behave. Further, the collision level index 110 may be calibrated in real time for the environmental data using a normalized data set for the local region. The system 100 (specifically the data gathering subsystems 104, 105 and 106) create the primitives that are summarized in the scoring database 107 prior to the creation of the contemplated indices. There is a plurality of methods for populating the system 100 with results in the scoring database 107. A unique embodiment of this scoring database 107 and the primitives selected includes the ability to utilize deep learning software on the mobile platform, or on external application to amalgamate the subsystems 104, 105 and 106 into trip data profile (a spatiotemporal representation of the trip).

Whether running as a backend service (most common) or as an onboard service, such as on the vehicle infotainment head unit or Smart Phone, both process the data similarly prior to its storage in the database 107. The machine-learning service may require access to environmental data, location specific risk and traffic data indexed by vehicle identifier either from a TSP or from a generally available public service (such as weather data provided by V2I services). The system 100 accesses several commonly-used machine adaptation techniques to amalgamate the subsystem data into a trip score. For example, the database query can provide access to interfaces for ranking, clustering, classifying, and prediction techniques. For example, a query of the primitives can provide most-frequently occurring speeds in similar traffic and weather conditions as an input to the machine-learning service.

The resulting data set can also be utilized to infer data that is not in the database, or cannot be accessed for a particular trip segment. For example, the application may not have access to location data for a mobile platform during a trip. However, the application could request the machine-learning service to predict the traffic density based on location. The machine-learning service need only provide the predictions, not the locations, to the driver safety index creation algorithm. As such, the machine-learning service can encapsulate the use of sensitive data.

The scoring database 107 constantly receives and places input data from multiple sources in archive 113 and/or video archive 111. The stored input data can be aggregated to discover features within the data; such as garaging locations based on actions and times (e.g., Home or Work). The techniques used by the in-database machine-learning service can also be implemented to work on the mobile device on a much smaller scale. For example, aggregated data can be used to train and/or set initial values for the machine adaptation techniques used by the scoring database service.

Exemplary uses of the machine-learning service can include:

Predicting a duration of trip before the trip starts, based on input location, time, other vehicles on the road, prior behavior, etc.

Predicting the percentage of time that will be spent speeding at the onset of the trip, based on input location, time, traffic, prior behavior, etc.

Predicting number of passengers in the vehicle, based on input location, time, music selection, prior behavior, etc.

Classifying trip risk profile based on the input maintenance status of the vehicle at the start, etc.

By providing access to the scoring database 107, a number of machine adaptation techniques designed to operate on and learn about user behavior can be enabled either on the backend 105 or on the mobile platform 103 to enable contextual machine-learning services.

From the scoring database 107, the machine-learning service can generate an output on at least one feature, or the plurality of features. An example might include selecting a machine-learning algorithm to perform the machine-learning operation. In particular embodiments, selecting the machine-learning algorithm to perform the machine-learning operation to synthesize a desired input, such as receiving an environmental input when one is missing but desired.

In other embodiments, the received data can include data related to a video, such as data related to one or more images that show a posted speed limit that is not available in the standard GIS Database, or data set 112. The machine learning algorithm performs the function to mine the incoming data stream for this data in an on-demand process.

The machine learning engine for the scoring database 107 performs the machine learning and then classifies, clusters, ranks, and/or predicts data states for the scoring result from given input data. Classification of driving variables varies by sampling frequency of the source data and therefore must be performed using a plurality of statistical classification techniques, such as, but not limited to, linear classifiers, support vector machines, quadratic classifiers, kernel estimation, decision trees, neural networks, traditional Bayesian networks, hidden Markov models, binary classifiers, and/or multi-class classifiers.

Clustering driving data provides an essential feature in the normalization process of local driving behaviors. Clustering driving scores involves putting the classified primitives (raw driving data) with a number N of possible values into one of X clusters, where X is finite, and where the clusters are not necessarily pre-determined or continuous in time. Generally, each data item in a given cluster is more similar to each other than to data item(s) in other cluster(s), but generally this is because of the temporal nature of the driving history. For example, a vehicle's location throughout the day within a geographic region will cluster at locations recently visited, such as work location(s), client location(s), and other relevant or expected location(s). Location clusters can vary from driver to driver, and are not fleet or business specific; a delivery driver who prepares product at a home office and then frequents a restaurant may consider the remote office as a "work location" and the restaurant as an "entertainment location", but his or her spouse who happens to work for the restaurant a "work location" and the home office as a "home location". Although a subtle distinction, the ability to normalize driving behavior correctly depends in many cases on the ability to infer the intent of the clustered trips.

When clustering data prior to ranking it for scoring purposes, it is often important to look at location specific network information such as wireless telecommunications networks, local area networks (WiFi), and other networks to determine if there are additional identifiers to discriminate or infer the purpose of the cluster around the origin or destination of the trip. Further, some context-related data can be received from a network such as number of other employees at "the office".

Possible context signals and/or sources of context information is almost unlimited, and that other context signals and/or sources of context information are possible in addition, or in the alternative.

For the determination of the score by database 107, an embodiment is chosen consistent with the context of the data collection process, primarily because identifying context helps predict commuting patterns and thereby create new predictors of exposure. For instance, an exemplary Driving Score may store context signals associated with "leaving for work," "driving to work," "driving home from work," and "arriving home." By knowing when these times are inconsistent with similar clustered activity a deviation in the result can be either tagged, or smoothed.

Other possibilities for machine learning may also exist with the very simple end objective of predicting the Driving Score for the next trip as way of determining significant deviations without seeding new clusters, and requiring X+1 clusters each time a significant deviation is detected between the value in the scoring database 107 and the predicted value in the scoring database.

Detailed Description of Indices Determination:

An objective of the index creation process is to create a predictive model that can accurately identify the occurrence of events which cause an increase in exposure or risk due to Vehicle risk (VRI) 109, Driver safety (DSI) 108 and collision level index (CLI) 110. It is not necessarily the intent of the method to create a final set of risk analytics from these three indexes; that task remains the domain of the individual insurance carrier.

Once the Driving Score for each trip has been computed and stored 107 the process of mining all the trip data, environmental data and collision data begins to classify the components of the three risk related variables, referred to here as the DSI, VRI and CLI index (108, 109, 110). The CLI is the first to be computed since it is the dependent variable in the computation of the VRI.

The majority of existing temporal classification methods assume that each input trip score (normally represented by a single series, but can be represented by multiple time series) is associated with a uni-variant classification, or profile, representing behavior for the entire trip. The conventional UBI models assume the prediction of risk to depend on the historical sum of events. That is, they assume that all temporal observations are potentially equally useful for classification and as such are time-independent. However, the assumption has been shown to not be suitable when considering event detection problems within the context of trips where the location and actors (other vehicles, weather, and pedestrians) are changing.

Given that trip scores are associated with specific time points (or time intervals), each time series or trip is affected by the most recent behavior. Our approach to mining the indices proposes a novel temporal pattern mining approach for event detection within the clustered trip scores, this approach takes into account driver experience levels and hyper-local nature of driving decisions. Mining temporal patterns backward in time, starting from trip or behavior patterns as an entire class related to the most recent trip (and Driver Score 107), results in a trip classification more valuable than the simple summary of events by classification within a trip. Incorporating the concept of trip aging in temporal pattern mining produces results more predictive of actual loss experience (as measured by collisions) than simply treating all trips as time independent (both from an aging and a duration perspective). An objective with the trip level mining, as compared to the vehicle detail mining, is to determine weights for indices from the trip duration and scoring patterns that can accurately predict adverse outcomes for future trips. This result is extremely useful in loss control or risk management because it enables reliable prediction of a loss before it occurs, and thereby provides value-added services such as intelligent driver monitoring/decision support when faced with adverse driving conditions.

The task of creating a predictive model from the indices can be challenging because they are multivariate and not a coherent representation of actual exposure. The method described works best when applied to large samples of data for which peer-to-peer analytics can be applied and exceedances by road segmented ranked and stored for analytics during low density traffic periods. Regardless of traffic density for the trip segment, the same reverse chronological method of pattern methods described in the individual trip scores are applied to determine the risk density functions used to produce the indices found in the results database 101 at the fleet level. The resulting indices are therefore available to use directly within the fleet's risk management program or, more likely, as an additional piece of data in a software application providing constructive driver risk feedback as an alternative to temporal data in raw forms such as speeding, cornering and braking.

An embodiment includes a method of enhancing the inherent accuracy of the onboard location technology by the application of driver safety index (DSI) offsets, over the V2I or other radio telemetry network, for specific driver characteristics to improve the accuracy of the GNSS signals and improve the response rate of these inputs to the vehicle's factory equipped or after-market safety system. This is illustrated in, and discussed further with respect to, FIG. 8.

An embodiment includes a mobile software application, operating on at least one computing device onboard the vehicle, to provide contextual driver feedback data (based on the VRI) to manually or automatically modify the vehicle systems responses based on peer vehicle sensor exceedances, or prevent the vehicle from operating in either a semi-autonomous or fully autonomous mode. This is illustrated in, and discussed further with respect to, FIG. 9.

An embodiment includes receiving, by at least one computing device, a plurality of asynchronous and heterogeneous digital data inputs streams from one or more service providers, the data inputs streams comprising vehicle related data; storing, by the at least one computing device, the vehicle related data, environmental data, and location specific data in a scoring database; and, by the at least one computing device, providing access to the scoring database to a plurality of insurers to use to set rates for a connected vehicle insurance. One or more service providers may comprise at least one of a vehicle OEM, an aftermarket telematics services provider, and a wireless carrier. The data inputs streams may include at least one of structured location data, diagnostic vehicle data, prognostic vehicle data, unstructured driver behavior data, structured driver behavior data, biometric data, imaged data, audio data, video data, and signaling data. An embodiment may further include differentiating, by the at least one computing device, connected vehicle insurance from usage based insurance by using asynchronous, mixed resolution data from dissimilar and sometimes incomplete data sets merged with high resolution environmental and location specific data to create a risk index for use by an insurer. The scoring database may comprise a driver safety data set, and may further comprise segmenting, by computing device, the driver and vehicle data set into a driver safety index, vehicle risk index and Collision Level index to be used to predict the appropriate risk variable for one policy. An embodiment may include using information from a VIN database and mileage data to rate an insurance policy using existing filed rating plans. An embodiment may include using the Collision Index to predict a likelihood of a collision for fleet vehicles or vehicles assembled in a virtual fleet based on demographics, and/or local geographic constraints.

An embodiment includes a system comprising at least one computing device configured to perform an insurance claims management process that provides event data, from within or external to the vehicle, for insurance claims management by creating a virtual replay of the event and real-time adjustment using prescribed data. The insurance claims management process may use imaging and video data to create an incident or collision reconstruction from an unsynchronized digital data set.

An embodiment includes a system comprising at least one computing device implementing a vehicle trip scoring database configured to create relative driver safety indices to be used to predict collisions based on the trip to trip standard deviation of the results. The relative driver safety indices may be used to calculate a trip to trip standard deviation based on an individual driver's fuel economy information as driver behavior data. The relative driver safety indices may include Vehicle and Collision indexes, and a driver safety index that is portable between different Vehicles provided the Vehicle and Collision indexes are known for an entire duration of exposure. The relative driver safety indices include a Drivers Index and a Collision index, and the Collision index comprises monitoring a policy holder or driver's response to the Drivers Index. The relative driver safety indices may include a vehicle risk index and exposed mileage and a Collision index, and the Collision index comprises monitoring the vehicle risk index and exposed mileage.

An embodiment includes a system comprising at least one computing device implementing a database accessible by insurance carriers, the database storing VINs, organized by geographic region, wherein the insurance carriers access the database to identify existing prospects or insured vehicles. The database may store mileage data, and the VIN and mileage data retrieved can be utilized to auto populate a rating table. The insurance carriers may access the database to generate training feedback for a fleet, based on a retrieved driver safety and Collision index. The insurance carriers may access the database to generate training feedback for a shared vehicle driver using a retrieved driver safety and Collision Index. The insurance carriers access the database to generate maintenance feedback for a fleet based on a retrieved vehicle risk and Collision index.

An embodiment includes a system comprising at least one computing device storing a plurality of types of data or a plurality of data sets, the at least one computing device being configured to allow a policy holder, an individual driver, group of drivers or fleet to selectively restrict transmission, by a service provider, of one or more of the plurality of types of data, or one or more of the plurality of data sets to an risk manager for use in a driver safety index. At least one computing device is further configured to uniquely identify a vehicle, or the embedded device, allows an individual vehicle, shared vehicles, or a fleet of vehicles to selectively restrict transmission, by the service provider, of a discriminate one or more of the plurality of data sets to the risk manager for use in a vehicle risk index. The at least one computing device or the embedded device is further configured to uniquely identify an individual vehicle, shared vehicles, or a fleet of vehicles to selectively restrict transmission, by the service provider, of a discriminate one or more of the plurality of data sets to the risk manager for use in a Collision Index.

Figure 6:
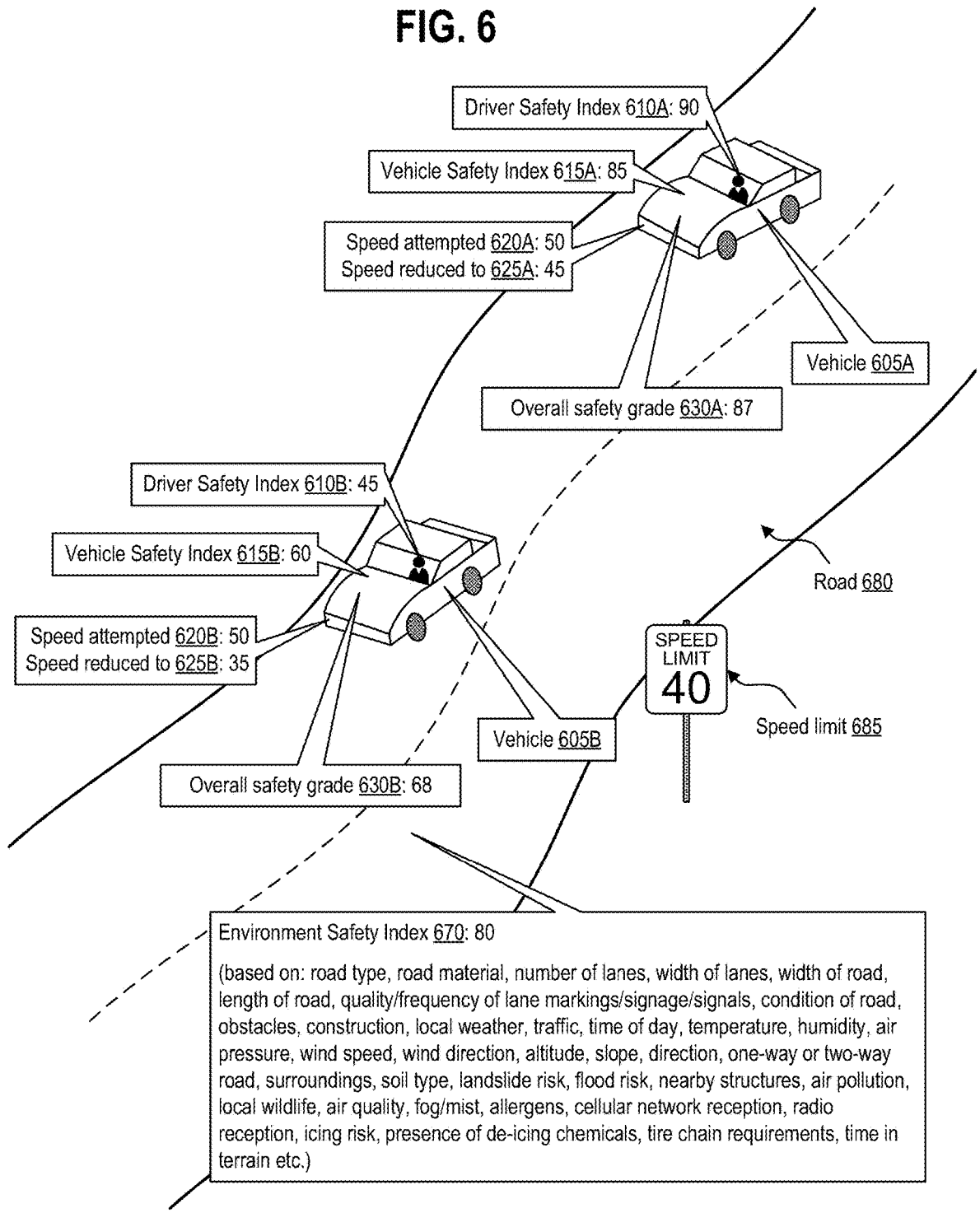
FIG. 6 illustrates data collected in near-real-time from vehicles such that safety and risk assessments regarding those vehicles may be identified.

FIG. 6 illustrates data collected in near-real-time from vehicles such that safety and risk assessments regarding those vehicles may be identified. This data may be collected by an application program that collects driver, vehicle, and environmental safety/risk information when a drive enhancement system or a vehicle speed limiting system is operational. In particular, FIG. 6 illustrates two vehicles—a first vehicle 605A and a second vehicle 605B—that are each driven by two different drivers along a single road 680 for which a posted speed limit 685 is 40 miles per hour (mph). The first vehicle 605A is attempting to drive at a speed 620A of 50 miles per hour, and vehicle control systems (such as those illustrated in FIG. 7) in the first vehicle 605A reduce this attempted speed 620A to a reduced speed 625A of 45 miles per hour. The second vehicle 605B is attempting to drive at a speed 620B of 50 miles per hour, and vehicle control systems (such as those illustrated in FIG. 7) in the second vehicle 605B reduce this attempted speed 620B to a reduced speed 625B of 35 miles per hour. The determination as to how much to reduce the speed for either vehicle can be based on the attempted speed 620A/B, a speed limit 685 applicable on the thoroughfare that the vehicle is on, a driver safety index (DSI) 610A/B of the driver, a vehicle safety index (VSI) 615A/B of the vehicle, an environmental safety index (ESI) 670 of the environment that the vehicle is driving in, an overall safety grade (OSG) 630 that combines at least two of the DSI 610 and/or VSI 615A/B and/or ESI 670 optionally as calculated by formula 1 shown below. The reduced speed may alternately be referred to as a speed threshold, a speed limit, a personalized speed threshold, or a personalized speed limit.

An overall safety grade 630A assigned to the first vehicle 605A and the first driver along this road 680 is 87 out of 100. This relatively high overall safety grade 630A indicates that, overall, there is a relatively low risk of this first driver driving the first vehicle 605A along the road 680. When possible, the overall safety grade 630A is calculated using the driver safety index 610A, the vehicle safety index 615A, and the environment safety index 670. Here, the first driver has a driver safety index 610A of 90 out of 100, meaning that the first driver is generally a safe driver. The vehicle safety index 615A of the first vehicle 605A is 85 out of 100, meaning that the first vehicle 605A is in relatively good condition and is relatively safe to drive. The environment safety index 670, as above, is 80 out of 100, which indicates that the environment is relatively safe to drive in—which factors in the road 680, the air, the weather, and other aspects of the environment discussed below.

An overall safety grade 630B assigned to the second vehicle 605B and the second driver along this road 680 is 68 out of 100. This mediocre overall safety grade 630A indicates that, overall, the risk of this second driver driving the second vehicle 605B along the road 680 is higher than the risk of the first driver driving the first vehicle 605A along the road 680. As discussed above, the overall safety grade 630B is generally calculated using the driver safety index 610B, the vehicle safety index 615B, and the environment safety index 670. Here, the second driver has a driver safety index 610B of 45 out of 100, suggesting that the second driver is generally not a very safe driver. The vehicle safety index 615A of the second vehicle 605B is 60 out of 100, meaning that the second vehicle 605B is in relatively mediocre condition and is not particularly safe to drive. The environment safety index 670 is 80 out of 100 as above.

The overall safety grade 630A, which corresponds to the first vehicle 605A and/or its driver and/or the environment that the first vehicle 605A is driving in, is higher than the overall safety grade 630B, which corresponds to the second vehicle 605B and/or its driver and/or the environment that the second vehicle 605B is driving in. As a result, even though both vehicles have an attempted speed 620A/B of 50 miles per hour, the first vehicle 605A has a reduced speed 625A of 45 miles per hour, while the second vehicle 605B has a reduced speed 625B of 35 miles per hour. The reduced speed 625A/B of any vehicle may be a static numeric limit, or may vary depending on the attempted speed 620A/B of the vehicle and/or speed limit 685 and/or any changes to the DSI 610A/B, VSI 615A/B, ESI 670, or OSG 630A/B. In particular, as any vehicle drives, the ESI 670 may sometimes change rapidly as time passes, as driving at night presents hazards not present during the daytime, and may also change as the vehicle drives through different areas with distinct climates, road conditions, traffic conditions, and the like. In situations where the reduced speed 625 should remain unchanged or should have a small degree of variability, the ESI 670 may be removed from consideration, or may be weighted as less important than the DSI 610 and VSI 615A/B, for example using a lower multiplier M3 as of formula 1. In areas where large environmental shifts are likely and where it is desirable to modify the reduced speed 625A/B on the fly, the ESI 670 may be weighted more heavily.

While all three of these safety indices (the driver safety index 610A/B, vehicle safety index 615A/B, and environment safety index 670) are generated and available for both vehicles in FIG. 6, this will not always be the case—sometimes the driver, vehicle, and/or environment will be largely unknown. In such cases—or simply for improved speed/performance—the overall safety grade 630A/B may be based on one or two of these indices rather than all three. In other cases, additional safety indices not discussed herein may be factored in to the overall safety grade 630A/B. The overall safety grade 630A/B may be computed in a number of ways, such as via an average of two or more of the driver safety index 610A/B, vehicle safety index 615A/B, and environment safety index 670. Such an average may be, for example, a mean, median, or mode. Such an average may be weighted to prioritize one or more of the indices used. An example of an equation used to achieve this weighting is shown in formula 1. For example, the driver safety index 610A/B can be ranked as most important and therefore can be weighted to have more influence on the overall safety grade 630A/B. Alternately, the vehicle safety index 615A/B or environment safety index 670 can be ranked as most important and therefore can be weighted to have more influence on the overall safety grade 630A/B.

The driver safety index 610A/B, as discussed above, may be based on factors such as driver health, driver age, number of years of experience as a driver, scores or grades awarded to the driver for each of one or more paper-based and/or behind-the-wheel-style driving tests, recent sensor measurement(s) of driver heartbeat, recent sensor measurement(s) of driver pulse, recent sensor measurement(s) of driver blood oxygen level, recent sensor measurement(s) of driver glucose level, recent sensor measurement(s) of driver perspiration level, recent sensor measurement(s) of driver body temperature, recent sensor measurement(s) of blood alcohol content, whether or not the vehicle identifies that the driver is wearing a seatbelt, whether or not the vehicle identifies that each of one or more passengers is wearing a seatbelt, duration of time that the driver has been driving without a rest break, number of vehicle-related accidents that the driver has been involved in, how recent one or more vehicle-related accidents that the driver was involved in were, whether the driver was found to be at fault in one or more vehicle-related accidents that the driver was involved in, reported eyesight quality of the driver, whether or not the driver is wearing glasses, whether or not the driver is wearing contact lenses, whether or not the driver is wearing sunglasses, one or more reported illnesses of the driver, one or more reported medical conditions of the driver, one or more reported disabilities of the driver, one or more reported medications that the driver is currently using, one or more reported medications that the driver is uses on a regular basis, an age of the driver, an age range into which the driver's age falls into, a gender or sex of the driver, a race or ethnicity or national origin of the driver, one or more camera-based and computer-vision-based determinations of whether the driver's eyes appear to be focused on the road or distracted and focused elsewhere, whether any driving data reported by the driver is suspected to be fraudulent, any other indication of driver safety or risk discussed herein, or combinations thereof. The driver safety index 610A/B is also referred to as the driver safety index 108 in FIG. 1.

The vehicle safety index 615A/B, as discussed above, may be based on factors such as mileage of the vehicle, age of the vehicle, number of owners of the vehicle over time, number of drivers of the vehicle over time, number of accidents that the vehicle has been in, number of repairs made on the vehicle, quantity of fuel remaining in each of one or more fuel storage tanks of the vehicle, type of fuel used by the vehicle (e.g., diesel, leaded gasoline/petrol, unleaded gasoline/petrol, ethanol, hydrogen, natural gas, propane, butane, kerosene, liquefied petroleum gas, electricity, biodiesel, methanol, p-series fuels, or hybrids/combinations thereof), damage incurred by the vehicle, modifications performed to the vehicle, weight being carried by the vehicle, class of vehicle, type of vehicle (e.g., boat, train, airplane, helicopter, sedan automobile, coupe automobile, sports utility vehicle automobile, truck automobile, semi-truck automobile, motorcycle), brand of vehicle, manufacturer of vehicle, distributor of vehicle, purchase date of vehicle, number of component recalls in the vehicle, presence or lack of airbags, presence or lack of heating, presence or lack of air conditioning, presence or lack of fans, tire pressure, quantity of oil, battery charge level of each of one or more batteries, presence or lack of tire chains, presence or lack of four-wheel-drive (4WD) capability by the vehicle, presence or lack of all-wheel-drive (AWD) capability by the vehicle, presence or lack of anti-lock brakes, quality and/or age and/or condition of the brakes, quality and/or age and/or condition of tires and/or tire treads, presence or lack of seat belts, any other indication of vehicle safety or risk discussed herein, whether the vehicle has autonomous driving capabilities, safety record of the vehicle's autonomous driving capabilities, level of driving autonomy, whether the vehicle has autonomous parking capabilities, safety record of the vehicle's autonomous parking capabilities, or combinations thereof.

Level of driving autonomy generally falls into a level from 0 to 5. Level 0 autonomy indicates that the vehicle is not autonomous at all, and the driver has full control. Level 5 autonomy indicates that the vehicle is fully autonomous and never requires driver input. Levels 1-4 are levels of driving autonomy in between level 0 and level 5. Level 1 autonomy indicates that most functions are still controlled by the driver, but a specific function—such as steering or accelerating—can be done automatically by the car. Level 2 autonomy indicates that aspects of steering and acceleration/deceleration are autonomous, as in cruise control and lane-centering, allowing drivers to take their hands off of the steering wheel and their foot off of the gas pedal simultaneously—but must always be ready to take control of the vehicle. Level 3 autonomy indicates that the vehicle is mostly autonomous but that the driver may be required to intervene under certain traffic or environmental conditions. Level 4 autonomy indicates that the vehicle is fully autonomous and is designed to perform perfectly for a full trip, but is not designed for certain driving scenarios or environments (e.g., dirt roads, off-roading). Level 5 autonomy indicates that the vehicle is fully autonomous and expected to perform equivalently to a human in every possible driving scenario. Overreliance on autonomous vehicles can cause drivers to fall out of practice and become poorer in everyday driving scenarios. Also, while a level 4 or level 5 vehicle might be safer than a human driver in certain situations (depending on the autonomous vehicle control system's safety record), Level 2 autonomy or Level 3 autonomy may actually pose a greater degree of risk than even Level 0, as drivers are likely to take their eyes off of the road and stop paying attention despite the incomplete degree of autonomy and occasional requirement that human drivers intervene.

The vehicle safety index 615A/B may also be referred to as the vehicle risk index (VRI) 109 as in FIG. 1. In some cases, the VRI 109 of FIG. 1 may have an inverse correlation, in that a high VRI 109 may indicate a high amount of risk for the corresponding vehicle and this a low amount of safety for the corresponding vehicle, meaning that the vehicle safety index (VSI) 615A/B is low. The opposite—that low VRI 109 correlates to high VSI 615A/B—may also be true.

The environment safety index 670 may be based on, for example, road type, road material, number of lanes, width of lanes, width of road, length of road, quality/frequency of lane markings/signage/signals, condition of road, obstacles, construction, local weather, traffic, time of day, temperature, humidity, air pressure, wind speed, wind direction, altitude, slope, direction, one-way or two-way road, surroundings, soil type, landslide risk, flood risk, nearby structures, air pollution, local wildlife, air quality, fog/mist, allergens, cellular network reception, radio reception, icing risk, presence of de-icing chemicals, tire chain requirements, time in terrain, any other indication of environment-based safety or risk discussed herein, or combinations thereof.

Road type is important as a bridge with steep drops on either side is generally inherently more risky to drive along than a freeway going through a relatively planar countryside. Furthermore, as "road" is used broadly here to refer to various types of thoroughfares, a train track is generally a safer type of "road" than a road for automobiles, as trains generally do not have to watch out for other vehicular traffic or pedestrians except at intersections of train tracks with other train tracks or automobile roads or other types of thoroughfares. Road material is important in that dirt roads or gravel roads are typically less safe and more risky than asphalt roads due to decreased traction. Number of lanes and is important, as more lanes can more easily permit passing, but can also cause issues due to dangerous weaving drivers. Width of lanes and width of the road in general is important, as wider lanes are more forgiving of slight unintended movements by vehicles, and therefore safer and less risky to drive along. Width of the road is important, as wider roads are more forgiving and give more room to maneuver along inherently risky terrain such as mountains or bridges. Length of the road (both length between stops and length overall) is important, as drivers going along a long road without any rest areas or stops may experience fatigue and endanger everyone on the road as a result. Length of the road is important, as drivers going along a long road without any rest areas or stops may experience fatigue and endanger everyone on the road as a result.

Quality and/or frequency of lane markings, signage, and road/traffic signals is important, as roads with faded or nonexistent lane markings are riskier and less safe than roads with fresh lane markings, and intersections without stop signs or traffic signals (or with defective/incorrect signs or traffic signals) are less safe than roads/intersections with more correct signage and working road/traffic signals. The condition of road is important, as roads with potholes and cracks are less safe than roads without such wear. Obstacles such as stopped cars, accident wreckage, pedestrians (e.g., along a road that runs near a school or shopping mall), or stray tree branches likewise make roads less safe. Construction is important, as roads/lanes can often be unexpectedly closed off or rerouted due to traffic, increasing risk by putting drivers on unfamiliar or unusual routes, and because construction can cause hazards and obstacles such as construction crew personnel, or flying rocks, dirt, dust, or sparks that can affect a vehicle.

Local weather is important, as unusual weather can affect safety and risk negatively. Precipitation such as rain, snow, sleet, or hail can decrease driving safety by obscuring or potentially damaging windshields and by depositing substances (snow, water, ice, hail) on the road that decrease vehicles' traction with the road. Other aerial phenomena, such as fog, mist, heavy winds, dust, tornadoes, whirlwinds, dust devils, can likewise obscure driving visibility or push/pull vehicles in directions that the driver is not directing the vehicle depending on wind speed and wind direction. Local traffic is important as well, as a road suffering bumper-to-bumper traffic is riskier to drive along than a road with little to no other vehicles along it. Time of day is important, as drivers driving late at night generally have lower visibility of their surroundings and are generally more fatigued and therefore drive less safely. At the same time, drivers driving at or near local sunset or local sunrise times are likely to experience sunlight shining in their eyes, which may similarly reduce visibility. Effects such as temperature, humidity, altitude, and air pressure may affect vehicle performance and may contribute to driver fatigue, potentially making a drive less safe. Slope, or road grade, is important in that a steep road (e.g., 20% grade or above) is riskier than a relatively flat one (e.g., 10% grade or below). Road direction can be important in combination with other factors such as slope, to determine if the road travels uphill or downhill, or wind direction, to determine whether the wind is pushing/pulling vehicles toward an unsafe direction, such as toward a cliff. Whether the road is a one-way road or a two-way road may also impact safety, as driving along one-way roads carries a lower risk of head-on collisions between vehicles.

Surroundings and nearby structures are important, in that a road near or along a cliff edge is riskier to drive along than a road in a relatively planar area, and a road alongside a hazardous waste facility or a school with many nearby pedestrians might be riskier to drive along than a road surrounded by fields of grass. Soil type and landslide risk are important, as softer soil or high landslide risk can increase the risk of the road collapsing, or the surroundings collapsing onto the road and any vehicles on it. Earthquake risk and flood risk are important in that areas prone to such disasters are less safe to drive in. Local wildlife, such as deer, can also serve as unexpected moving obstacles for drivers to avoid, and represent risk. Air pollution, air quality, bad smells, and allergens can sometimes increase risk by damaging vehicles, distracting drivers, or causing drivers to drive quickly to escape affected areas. Icing risk, tire chain requirements, and presence of de-icing chemicals are important in that icy roads have little traction and are therefore dangerous. Poor cellular network reception or radio reception can also represent a distraction for drivers who might be tempted to fiddle with radios or cellular devices that have stopped working properly. Icing risk can cause slippery and dangerous roads, a risk which may be mitigated by presence of de-icing chemicals such as salt on the road. If there is a tire chain requirement for a particular stretch of road, that generally indicates that that stretch of road is at risk of being very snowy and/or icy and may have steep terrain as well, which may indicate risk particularly if the vehicle at issue does not have tire chains applied and/or does not have 4WD or AWD capabilities. Time in a particular terrain or environment type may also be an issue, as extended periods of time in very cold or very hot or very wet conditions, for example, might cause vehicle components of some vehicles to expand, contract, freeze, melt, rust, deform, or otherwise undergo a modification that results in these components not functioning as they original would or as they are intended to function, thereby providing extra risk.

While not illustrated or included in FIG. 6 or formula 1, a fourth index—the collision level index (CLI) 110 discussed with respect to FIG. 1—may alternately or additionally be used in the calculation of the overall safety grade 630 and/or the reduced speed 625 for each vehicle. The CLI 110, as discussed herein, can concern factors such as how safe the vehicle in question is in the event of an accident/collision, and/or how likely the driver of the vehicle is to get into am accident/collision based on the driver's past history of accidents/collisions and/or based on demographic data such as age, gender, medical conditions, and the like. Ultimately, the CLI 110 may be an index that based on a combination of factors described herein as possible bases for the DSI 610AB, the VSI 615A/B, and/or the ESI 670A/B.

While FIG. 6 illustrates generation of speed thresholds or limits that are personalized or customized to the driver and/or to the vehicle and/or to the environment—that is, the "speed reduced to" 625A/B values—other types of personalized or customized thresholds or limits can also be generated. For instance, personalized or customized thresholds or limits can be generated for acceleration, deceleration, turning radius, brake strength, duration of horn usage, frequency of horn usage, duration of high-beam usage, frequency of high-beam usage, or combinations thereof. Like for speed, these may be personalized or customized to the driver and/or to the vehicle and/or to the environment. For example, an extremely aggressive driver with a low driver safety index 610A/B might be prevented from accelerating too sharply or honking too often or for too long. A vehicle with a low vehicle safety index 615A/B might similarly be prevented from accelerating too hard or turning too sharply to avoid further damage to the vehicle. A vehicle driving in a risky area with a low environment safety index 670, such as along a cliff side, might also be prevented from accelerating too hard. Similarly, a vehicle driving in heavy traffic might be prevented from accelerating too hard, honking too frequently/long, or using its high beams too frequently/long.

Formula 1 is an equation identifying a calculation for an overall safety grade. The equation formula 1 is a mean calculation that introduces multipliers into both the numerator and denominator. In the numerator, the driver safety index (DSI) 610 is multiplied by a multiplier value M1, the vehicle safety index (VSI) 615 is multiplied by a multiplier value M2, and the environment safety index (ESI) 670 is multiplied by a multiplier value M3. The denominator is the sum of the three multipliers (M1, M2, and M3).

$$(OSG\ 630) = \frac{(DSI\ 610)*(M1) + (VSI\ 615)*(M2) + (ESI\ 670)*(M3)}{(M1 + M2 + M3)} \quad \text{Formula 1}$$

A higher multiplier value indicates that the corresponding index that the multiplier multiplies will be weighted more heavily. For example, the driver safety index 610 can be ranked as most important and therefore can be weighted to have more influence on the overall safety grade 630 when the multiplier M1 is a higher value than multipliers M2 and M3. The vehicle safety index 615 can be ranked as most important and therefore can be weighted to have more influence on the overall safety grade 630 when the multiplier M2 is a higher value than multipliers M1 and M3. The environment safety index 670 can be ranked as most important and therefore can be weighted to have more influence on the overall safety grade 630 when the multiplier M3 is a higher value than multipliers M1 and M2.

The CLI 110 or another safety index, along with a corresponding multiplier, can also be added to the numerator of the equation of formula 1, with the corresponding multiplier also being added to the denominator of the equation of formula 1. Similarly, in some cases, the OSG 630 can be calculated without factoring in certain indices at all, essentially by setting their corresponding multipliers to zero.

Figure 7:
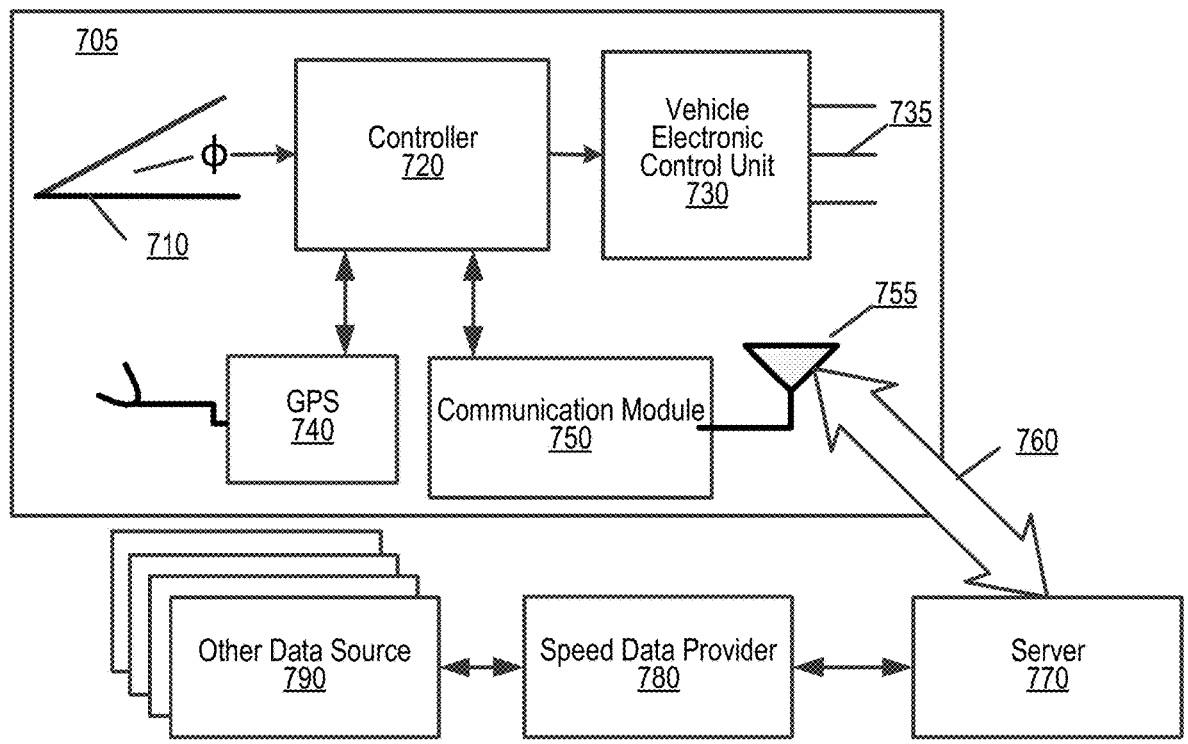
FIG. 7 illustrates a vehicle electronic control system/subsystem consistent with the present disclosure.

FIG. 7 illustrates a vehicle electronic control system/sub-system consistent with the present disclosure. The subsystem of FIG. 7 includes a vehicle accelerator (i.e. a throttle or gas pedal) 710, a controller 720, a vehicle electronic control unit (ECU) 730, a global positioning system (GPS) or other GNSS module 740, and a communication module 750. When a driver depresses accelerator 710, a measure relating to how much the accelerator is depressed may be sensed by controller 720. The measure of accelerator depression may correspond to an angle like Φ of FIG. 7. As such, Φ may correspond to a measure of resistance when accelerator 710 is coupled to a rheostat (not depicted).

GPS module 740 may receive satellite information via antenna 755 and communicate that information to controller 720. In such an instance, GPS module 740 may provide information (such as longitude and latitude data) that identifies a current location of the vehicle to controller 720. Controller 720 may then transmit that location information via communication module 750 and communication antenna 755 to an external computing device. Communication module 1150 may be implemented via any type of communication technology discussed with respect to the input devices 1025 and/or output devices 1030 of FIG. 10, including yet not limited to wireless cellular (2G, 3G, 4G, or other) communications, radio communications, or other communication technologies and/or protocols.

In certain instances, the information provided to an external computing device via communication module 750 and antenna 755 may be pushed (i.e. proactively sent to) to the external computing device or be pulled by the external computing device (i.e. sent in response to a ping or to a message that was sent from the external computing device). The information sent to the external computing device may also include a GPS location that corresponds to a speed limit or to a replacement maximum speed of particular locations.

Information may also be received from an external computing device via antenna 755 and communication module 750 that may identify a speed limit along a roadway or a replacement maximum speed, such as the personalized/customized speed thresholds/limits discussed with respect to FIG. 6. The information received from the external apparatus may be passed to controller 720 where controller 720 may compare current GPS location information with the received maximum speed information as controller 720 controls the maximum speed of the vehicle as the vehicle travels down a roadway. This information may be referred to as a control signal and also identify any of the other personalized/customized thresholds/limits discussed with respect to FIG. 7, such as the limits on acceleration, braking, turning, or honking.

When controller 720 identifies that a maximum speed of the vehicle should be changed, controller 720 may provide information to ECU 730 that limits the maximum speed of the vehicle, where ECU 730 controls the speed of the vehicle using vehicle control outputs 735. As such, vehicle control outputs 735 may be coupled to an engine, electric motor, or other apparatus that may limit the speed of the vehicle. In certain instances, controller 720 can limit the speed of the vehicle by directly providing speed control to an engine, an electric motor, or other apparatus. Controller 720 may, thus, bypass ECU 730 when limiting the speed of the vehicle. Acceleration controls operate similarly, and may for example provide a limit or threshold on revolutions per minute of an engine of the vehicle, or even on maximum angle or amount to which the accelerator 710 is permitted to be depressed by the driver.

While the maximum speed of a vehicle may be limited by controller 720 intercepting accelerator position and by providing substituted accelerator position data to ECU 730, the present disclosure is not limited to this technique. Alternatively, the speed of a vehicle may be controlled via other means, including, yet not limited to: applying controlled braking or dynamic braking (electronic vehicles), by controlling the pulse with of a pulse width modulation signal that provides power to electrical motors, by controlling fuel as it is delivered to an engine, or by other means.

The system of FIG. 7 may include sub-system 705 that resides within a vehicle, such as the telemetric devices discussed herein. Controller 720 may receive location information from GPS unit 740 and may provide that location information to an external computing device, such as a remote server 770 that is a computing device 1005 as discussed in FIG. 10, via communication module 750 and communication antenna 755. Note that FIG. 7 also illustrates a wireless signal 760 that communicates information to external server 770. External server 770 may periodically ping a vehicle control sub-system of a vehicle for location information. In such instances, server 770 may send a communication that requests (i.e. that "pings") that vehicle control sub-system 705 send location information to the server 770. Server 770 may also send some or all of this information received from vehicle control sub-system 705 to speed data provider 780 for analysis. Note that server 770 may ping vehicle control subsystem 705 periodically (i.e. every 110 seconds, for example). The server 770 may be used for calculation of any of the safety indices discussed herein (e.g. DSI 610, VSI 615, ESI 670, OSG 630, CLI 110), any personalized or customized thresholds or limits as discussed with respect to formula 1 or FIG. 6, any location estimates as discussed with respect to FIG. 8, or any vehicle condition comparisons and/or recommendations as discussed with respect to FIG. 9.

Server 770 may receive GPS data from sub-system 705 via wireless signal 760, and server 770 may communicate this GPS data to speed data provider 780. Speed data provider 780 may also receive data from one or more other sources 790. In certain instances, speed data provider 780 may track a route along which a vehicle is traveling. Speed data provider 780 may then provide information to server 770 that relates to the route along which the vehicle is traveling. The information provided by the speed data provider 1180 may include information that identifies: a speed limit at a location, a maximum speed setting that corresponds to the location, or may include other information that is pertinent to limiting the maximum speed of the vehicle as it travels along the route. Server 770 may also forward the information provided by speed data provider 780 to sub-system 705 such that controller 720 may control the maximum speed of the vehicle according to the information provided by speed data provider 780.

Speed data provider 780 may retrieve or be provided data from other data sources 790 when preparing information to send to server 770. Sources of this other data include, yet are not limited to electronic devices that are directly connected to roadway infrastructure (such as signal lights) and services that post roadway information. These other data sources 790 of FIG. 7 may be a system that collects information related to a roadway or be a system that provides weather information regarding an area around the roadway. As such, data collected from other sources 790 may include information relating to an accident, information related to road hazards, or information related to weather conditions. In certain instances, server 770 or speed data provider 780 may provide information relating to real-time information that limits the speed of the vehicle along a roadway based on current road conditions. For example, when server 770 or speed data provider 780 identifies that it is raining along a certain section of roadway where a vehicle is traveling, information may be sent to communication module 750 such that controller 720 may limit the speed of the vehicle to 45 MPH, for example. In yet other instances, the speed of a vehicle may be limited to speeds stored in memory at sub-system 705.

In certain instances, the functions of server 770 and speed data provider 780 discussed herein may be implemented by different computing devices that communicate with each other over a data communication interface. In yet other instances, the functions of server 770 and speed data provider 780 may be implemented in a single computing system. As such, server 770 and speed data provider 780 may reside in different physical locations or may be co-located at a single physical location. In certain instances, speed data provider 780 and server 770 may communicate with each other over the internet.

While data may be transmitted from a vehicle control sub-system periodically, data may also be transmitted from a vehicle control sub-system whenever the vehicle control sub-system has detected a change in the route being driven. A change in route may, for example, be identified when a vehicle turns more than a threshold number of degrees off a particular route. Alternatively or additionally, a change of route may be identified when a vehicle turns onto another roadway. In certain instances data may be transmitted from a vehicle when an anomalous condition has been observed. Alternatively or additionally data may be transmitted from a vehicle when an event is detected. For example, when a vehicle stops moving or when the vehicle is involved in an accident a vehicle control sub-system may send a message to an external electronic device.

Since transmissions to server 770 may not (always) be periodic, server 770 or speed data provider 780 may also use timing information when the speed of a vehicle is controlled. In one instance, controller 720 may transmit a relative or absolute time via communication module 750, antenna 755, and signal 760 when location information is transmitted from sub-system 705 to server 770, and server 770 may also transmit this time based information when vehicle location information is transmitted to speed data provider 780. In such instances, speed data provider 780 could calculate or identify measures of vehicle speed by evaluating relative changes in vehicle location and changes in time between different relative locations.

Figure 8:
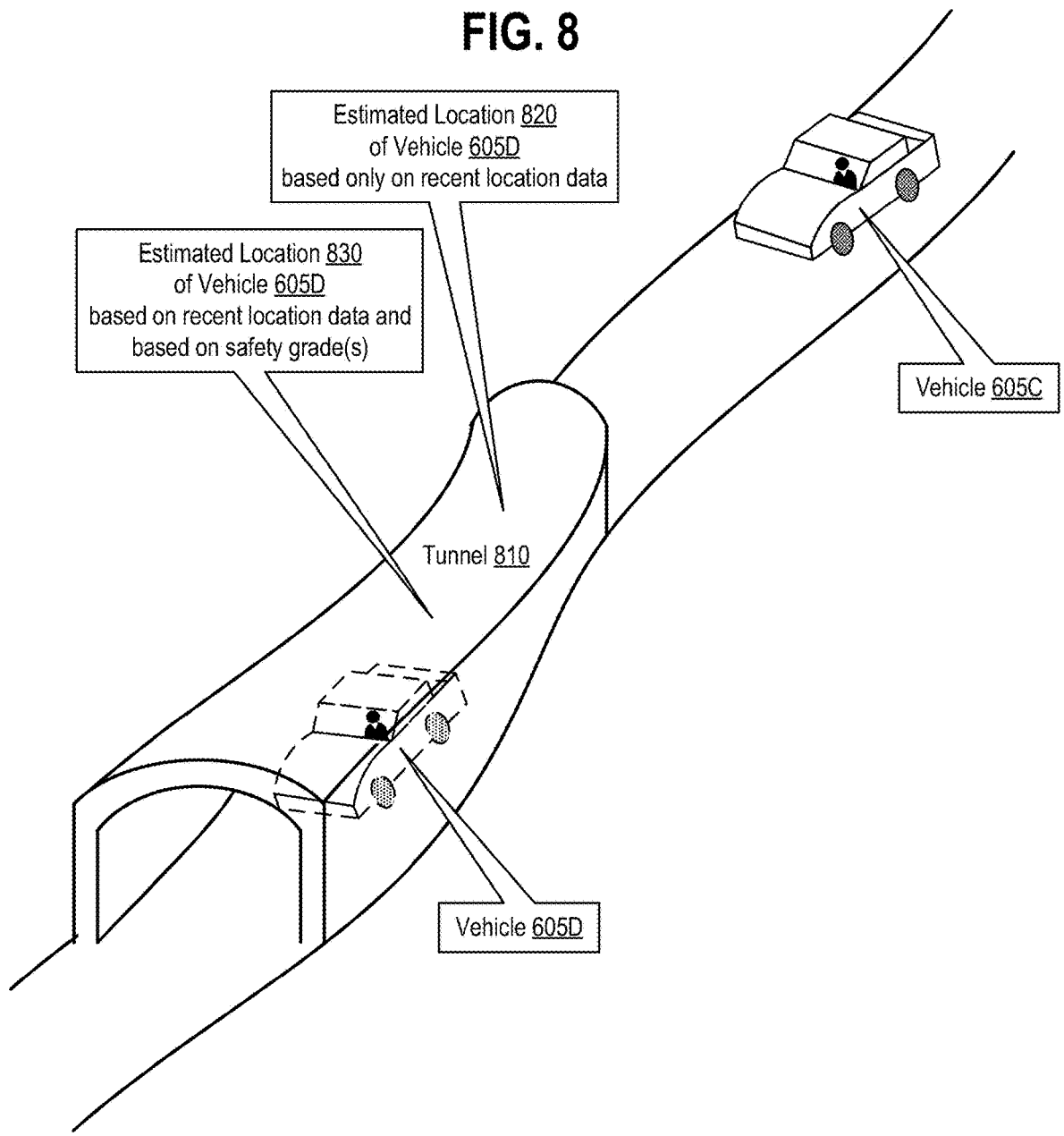
FIG. 8 illustrates the automatic enhancement of vehicle positioning based on safety grading.

FIG. 8 illustrates the automatic enhancement of vehicle positioning based on safety grading. In particular, FIG. 8 illustrates a first vehicle 605C and a second vehicle 605D driving along a road. The first vehicle 605C is driving in an uncovered segment of road, while the second vehicle 605D is driving in a tunnel 810. Tunnels 810 and other signal obstacles such as trees or tall buildings are known to cause inaccuracies in vehicle positioning or even complete inability to perform vehicle positioning when vehicles are positioned based on data gathered from GNSS receivers and when those vehicles are inside said tunnels 810 or when signals from GNSS satellites are otherwise blocked or muddled by signal obstacles.

Since the first vehicle 605C of FIG. 8 is uncovered, there should be no issues in finding the vehicle's location using a GNSS receiver. However, because the second vehicle 605D is going through the tunnel 810, which may block or weaken GNSS satellite signals before they reach the GNSS receiver of the vehicle or its telemetric device, vehicle positioning may be inaccurate or even impossible using traditional GNSS positioning methods.

One way to estimate the location of the second vehicle 605D in the tunnel 810 is by calculating or estimating a speed of the vehicle from the last few measured locations of the second vehicle 605D, assume that the speed will be constant for the duration of the tunnel 810, then extrapolate an estimated location 820 from the speed, direction, last known location, and current time. A first estimated location 820 generated using this method is shown in FIG. 8. While a location estimated using this method may be accurate for short, straight tunnels, for example, it might be less accurate once more complicated routes are factored in, such as turns, intersections, stop signs, and the like. Such complexities are common in cities with tall buildings that might act as GNSS signal obstacles much like tunnels 810 do.

In order to provide a more accurate estimate of location for more complex paths, the driver safety index (DSI) 610, vehicle safety index (VSI) 615, environment safety index (ESI) 670, overall safety grade (OSG) 630, and collision level index (CLI) 110 of formula 1 and FIG. 1. Note that any individual factor described herein as a basis for one or multiple of these indices, or combinations thereof may be used in the location estimate process. For instance, if the driver has a habit of accelerating into turns, this may be reflected in the DSI 610 and may provide a more accurate estimate of location of the vehicle in a tunnel 810 with many twists and turns or a city route with numerous turns.

One way to factor in the safety indices discussed above to generate the enhanced estimated location 830 is by generating an offset to apply to the first estimated location 820. This offset is a numeric value. The offset may be a location offset distance indicating that the driver or vehicle is likely to overshoot or undershoot, or drift to the left or to the right, where applying the offset to the estimated location 820 of the vehicle includes moving the estimated location of the vehicle by the location offset distance. The offset may be a speed offset value indicating that the driver or vehicle is likely change speeds to a higher or lower speed, or their speed might be underrepresented or overrepresented as currently calculated based on the most recent locations, where applying the offset to the estimated location of the vehicle includes recalculating the estimated location of the vehicle based on the location data, the speed of the vehicle adjusted by the speed offset value, and a current time. The offset may be an acceleration or deceleration offset value indicating that the driver or vehicle is likely accelerate or decelerate, where applying the offset to the estimated location of the vehicle includes recalculating the estimated location of the vehicle based on the location data, the speed of the vehicle adjusted gradually based on the acceleration or deceleration offset using kinematics equations (e.g., speed=acceleration*time+initial speed).

While FIG. 8 illustrates a vehicle 605D that is entirely occluded from GNSS signal receipt by a tunnel 810, these techniques may be used to improve positioning in other situations, such as between position polling. For example, if position data is only updated every 20 seconds, these techniques may be used to estimate position in the time between those position updates. They may also improve positioning in cities or other areas where GNSS signal reception can be spotty.

Figure 9:
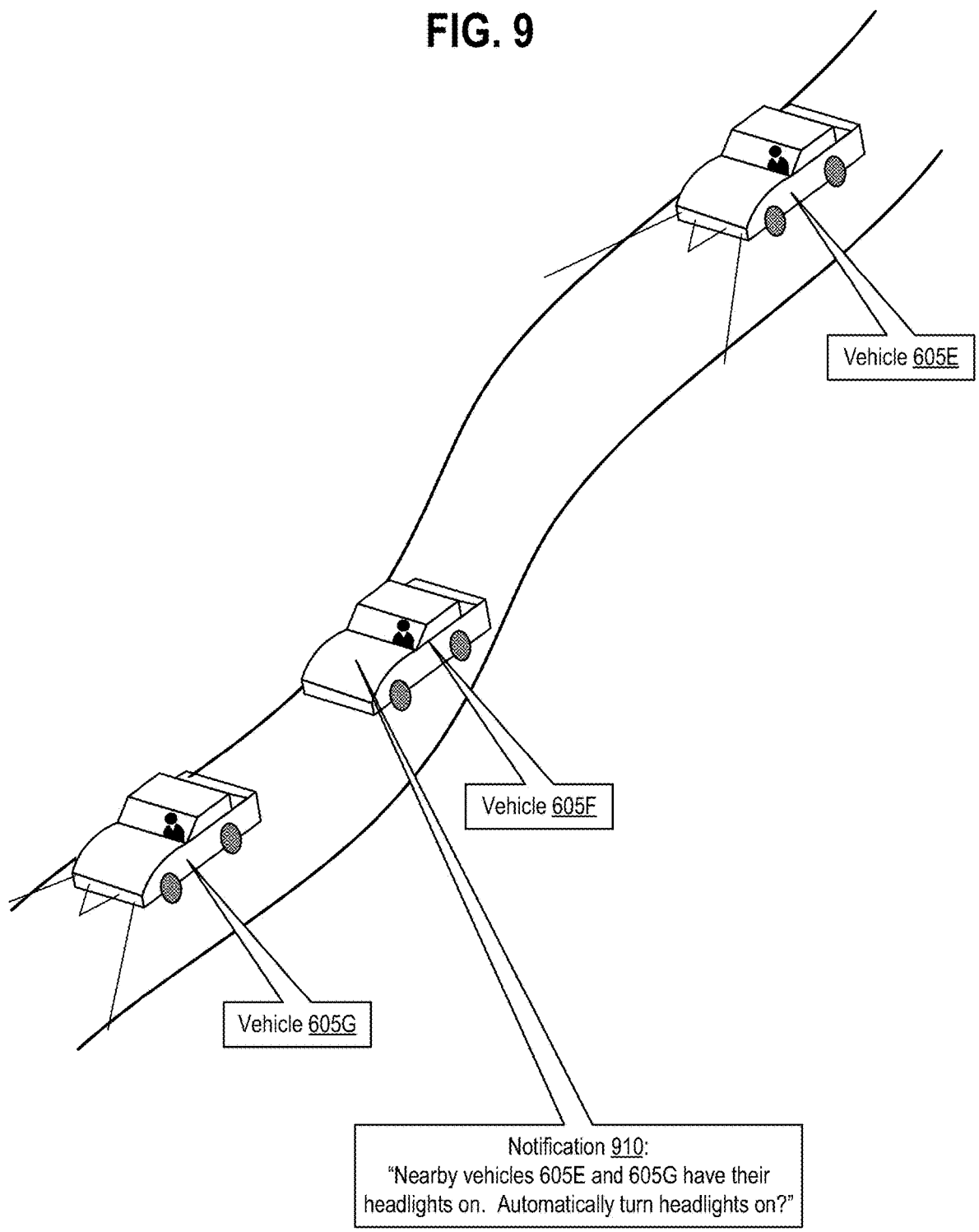
FIG. 9 illustrates intelligent vehicle control based on nearby vehicle behavior.

FIG. 9 illustrates intelligent vehicle control based on nearby vehicle behavior. Three vehicles 605E-G are pictured in FIG. 9, a first vehicle 605E, a second vehicle 605F, and a third vehicle 605G. The first vehicle 605E and the third vehicle 605G have their headlights on, while the second vehicle 605F does not. A server 770 of FIG. 7 may receive data from telemetric devices of all three of the vehicles 605E-G, the data describing conditions of the vehicles. In this case, one condition of the first vehicle 605E and the third vehicle 605G is that they have their headlights on, while one condition the of the second vehicle 605F is that it does not have it headlights on. These conditions may similarly concern whether or not the vehicle has windshield wipers on, whether or not the vehicle has automated driving assistance on, whether or not the vehicle has tire chains on, whether or not the vehicle has air conditioning on, whether or not the vehicle has a fan on, whether or not a driver and/or one or more passengers the vehicle have their seatbelts on, whether or not the vehicle is damaged, a sensor-measured temperature inside the vehicle, a sensor-measured temperature outside the vehicle, an amount of fuel in the vehicle, and anything that the VSI 615 can be based on as discussed herein. Automated driving assistance may refer to one or more vehicle control systems that automatically steers the vehicle to keep within its lane, helps guide the vehicle into a parking space, automatically brakes and/or swerves when the vehicle encounters a dangerous situation, automatically alerts the driver when the driver appears to be tired based on sensor data, autonomously drives the vehicle, or some combination thereof.

The server 770 of FIG. 7 can compare the conditions of the different vehicles, and can compare safety ratings associated with each condition and/or the corresponding vehicles and/or drivers and/or environments. For example, the server 770 may determine that it is nighttime, so the condition of having headlights on has a higher safety rating in a database than the condition of not having headlights on. Similarly, the server 770 may determine that it is raining, so the condition of having windshield wipers on has a higher safety rating in a database than the condition of not having windshield wipers on. The server may also make this determination based on the comparative DSI 610, VSI 615, CLI 110, and/or OSG 630 of different drivers and/or vehicles. For example, if a vehicle/driver combination with a higher OSG has it headlights on but a vehicle/driver combination with a lower OSG does not, the vehicle/driver combination with a higher OSG can be judged to be in the safer condition. Finally, majority can factor into this—if a majority of vehicles are in one condition and a minority are in a second condition, the majority condition may be judged to be safer.

The server 770 may then transmit a notification 910 to any vehicle that is in a non-optimal condition, the notification 910 recommending the change to a safer condition. For example, in FIG. 9, a telemetric device associated with the second vehicle 605F receives a notification 910 from the server 770 that recommends turning on the headlights, since the other two vehicles 605E/G have them on. In some cases, the notification 910 may be a control signal that actually causes the vehicle 605 to change conditions via the vehicle electronic control unit 730 discussed in FIG. 7. In this way, the vehicle 605F may automatically turn its lights on if the majority of vehicles around it have their lights on. This may also be applied to acceleration, deceleration, braking, etc. For example, if all but one car in a traffic jam are decelerating rapidly, the non-decelerating car may receive a notification 910 to decelerate, or may receive a control signal causing it to decelerate automatically via vehicle electronic control unit 730. Finally, if the condition is a sensor measurement, related condition may be recommended, such as a corresponding action to remedy an issue identified by the sensor measurement. For example, if many cars report sensor measurements of high temperature, some cars that do not might receive a notification 910 recommending or causing those cars turn on air conditioning. If many cars report sensor measurements of low temperature, some cars that do not might receive a notification 910 recommending or causing those cars turn on heating.

The conditions of the vehicles may be alternately be referred to as states of the vehicles.

FIG. 10 includes a schematic diagram illustrating a computing system environment in which the present technology can be implemented and operated. The computing system environment 1005, as illustrated, is an example of a suitable computing environment, however, it should be appreciated that other environments, systems, and devices may be used to implement various embodiments of the methods and systems as described in more detail below. Components included in computer system 1005 may be used to implement client device 1050, computer system 1065, or server 1070 of FIG. 10

Embodiments of the methods and systems may be implemented in hardware, firmware, software, or a combination of two or more of each. Embodiments of the methods and systems may be operational with numerous general-purpose or special purpose computing system environments or configurations. Examples of well-known computing systems, environments, and/or configurations that may be suitable for use with embodiments of the methods and systems include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Embodiments of the methods and systems may be described in the general context of computer-executable instructions, such as program modules being executed by a computer. Generally, program modules include routines, programs, objects, components, data structures, etc. that perform particular tasks or implement particular abstract data types. Embodiments of the methods and systems may also be practiced in distributed-computing environments where tasks are performed by remote processing devices that are linked through a communications network. In a distributed computing environment, program modules may be located in both local and remote computer storage media including memory storage devices.

With reference to FIG. 10, an exemplary system for implementing an embodiment of the methods and systems includes a processing device, such as computing device 1005. The computing device 1005 may include at least one processor 1015, memory 1010, removable storage 1020, inputs 1025, outputs 1030, and communication interface 1035.

Depending on the exact configuration and type of computing device, memory 1010 may be volatile (such as random-access memory (RAM)), nonvolatile (such as read-only memory (ROM), flash memory, etc.) or some combination of the two.

Additionally, the device 1005 may have additional features, aspects, and functionality. For example, the device 1005 may include additional storage 1020 (removable and/or non-removable) which may take the form of, but is not limited to, FLASH memory, magnetic or optical disks or tapes. Such additional storage is illustrated in FIG. 7 by additional storage. Computer storage media includes volatile and nonvolatile, removable and non-removable media implemented in any method or technology for storage of information such as computer-readable instructions, data structures, program modules or other data. Memory 1010 is illustrated as including both volatile and non-volatile memory storage devices. Computer storage media includes, but is not limited to, RAM, ROM, EEPROM, FLASH memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 1005. Any such computer storage media may be part of device 1005.

The device 1005 may also include a communications connection or interface 1035 that allows the device to communicate with other devices. The communications connection 1035 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, the communication media includes wired media such as a wired network or direct-wired connection, and wireless media such as acoustic, radio-frequency (RF), infrared and other wireless media. The term computer-readable media as used herein includes both storage media and communication media.

The device 1005 may also have an input device 1025 such as keyboard, mouse, pen, voice-input device, touch-input device, etc. Further, an output device 1030 such as a display, speakers, printer, etc. may also be included. Additional input devices 1025 and output devices 1030 may be included depending on a desired functionality of the device 1005. Input devices 1025 may include circuitry providing a portion of a user interface. Input devices 1025 may include an alpha-numeric keypad, such as a keyboard, for inputting alpha-numeric and other information, or a pointing device, such as a mouse, a trackball, stylus, or cursor direction keys. Input devices 1025 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, wireless local area network (WAN) signal transfer, cellular data network wireless signal transfer, personal area network (PAN) signal transfer, wide area network (WAN) signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Input devices 1025 may include any ports, plugs, antennae, wired or wireless receivers, wired or wireless transceivers, or any other components necessary for or usable to implement the communication types listed above, such as cellular SIM cards.

Input devices 1025 may include receivers or transceivers used for positioning of the computing system 1005 as well. These may include any of the wired or wireless signal receivers or transceivers. For example, a location of the computing system 1005 can be determined based on signal strength of signals as received at the computing system 1005 from three cellular network towers, a process known as cellular triangulation. Fewer than three cellular network towers can also be used—even one can be used—though the location determined from such data will be less precise (e.g., somewhere within a particular circle for one tower, somewhere along a line or within a relatively small area for two towers) than via triangulation. More than three cellular network towers can also be used, further enhancing the location's accuracy.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

FIG. 10 also illustrates various different computers that are communicatively coupled together 1000. FIG. 10 includes an electronic client device 1055, such as a personal computer or workstation, tablet, smart phone or other device that may include a processing element, that is linked via a communication medium, such as a network 1060 (e.g., the Internet), to an electronic device or system, such as a server 1070. The server 1070 may further be coupled, or otherwise have access, to a database 1075 and a computer system 1065. Although the embodiment illustrated in FIG. 8 includes one server 1070 coupled to one client device 1050 via the network 1055, it should be recognized that embodiments of the methods and systems may be implemented using one or more such client devices coupled to one or more such servers over one or more such networks.

The client device 1050 and the server 1070 may include all or fewer than all of the features associated with the device 1005 of FIG. 10. The client device 1050 includes or is otherwise coupled to a computer screen or display 1055. The client device 1050 may be used for various purposes such as network and/or local computing processes.

Display system 1055 may include a liquid crystal display (LCD), a plasma display, an organic light-emitting diode (OLED) display, an electronic ink or "e-paper" display, a projector-based display, a holographic display, or another suitable display device. Display system 1055 receives textual and graphical information, and processes the information for output to the display device. The display system 1055 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

The client device 1050 is linked via the network 1060 to server 1070 so that computer programs, such as, for example, a mobile or other application, running on the client device 1050 can cooperate in two-way communication with server 1070. The server 1070 may be coupled to database 1075 to retrieve information therefrom and to store information thereto. Database 1075 may have stored therein data (not shown) that can be used by the server 1070 to enable performance of various aspects of embodiments of the methods and systems. Additionally, the server 1070 may be coupled to the computer system 1065 in a manner allowing the server to delegate certain processing functions to the computer system. In an embodiment, the client device 1050 may bypass network 1060 and communicate directly with computer system 1065.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 1005 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for automated vehicle control, the method comprising:
receiving a first condition of a first vehicle from a first telemetric device carried by the first vehicle, wherein the first vehicle is on a thoroughfare on a date at a time of day;
receiving a second condition of a second vehicle from a second telemetric device carried by the second vehicle, wherein the second vehicle is on the thoroughfare on the date at the time of day, wherein the second condition is different from the first condition;
determining an environmental condition of at least the thoroughfare on the day at the time of day;
identifying a first safety score associated with the first condition during the environmental condition of at least the thoroughfare on the date at the time of day based on a first query of a database that indicates respective safety scores corresponding to different vehicle conditions during different environmental conditions;
identifying a second safety score associated with the second condition during the environmental condition of at least the thoroughfare on the date at the time of day based on a second query of the database;
generating a command based on an identification that the second safety score exceeding the first safety score; and
transmitting the command to an electronic control system of the first vehicle that results in the first condition of the first vehicle being changed to correspond to the second condition while the first vehicle is on the thoroughfare on the date and at the time of day.

2. The method of claim 1, wherein the first condition indicates that headlights are turned off and the second condition indicates that headlights are turned on, wherein the environmental condition is associated with a level of environmental illumination, and wherein transmitting the command to the electronic control system of the first vehicle switches headlights of the first vehicle from off to on.

3. The method of claim 1, wherein the first condition indicates that windshield wipers are turned off and the second condition indicates that windshield wipers are turned on, wherein the environmental condition is associated with weather, and wherein transmitting the command to the electronic control system of the first vehicle switches windshield wipers of the first vehicle from off to on.

4. The method of claim 1, wherein the first condition indicates that automated driving assistance is turned off and the second condition indicates that automated driving assistance is turned on, and wherein transmitting the command to the electronic control system of the first vehicle switches automated driving assistance of the first vehicle from off to on.

5. A system for automated vehicle control, the system comprising:
a memory; and
one or more processors that executes instructions out of the memory to:
receive a first condition of a first vehicle from a first telemetric device carried by the first vehicle, wherein the first vehicle is on a thoroughfare on a date at a time of day;
receive a second condition of a second vehicle from a second telemetric device carried by the second vehicle, wherein the second vehicle is on the thoroughfare on the date at the time of day, wherein the second condition is different from the first condition;
determine an environmental condition of at least the thoroughfare on the day at the time of day;
identify a first safety score associated with the first condition during the environmental condition of at least the thoroughfare on the date at the time of day based on a first query of a database that indicates respective safety scores corresponding to different vehicle conditions during different environmental conditions;
identify a second safety score associated with the second condition during the environmental condition of at least the thoroughfare on the date at the time of day based on a second query of the database;
generate a command based on an identification that the second safety score exceeding the first safety score; and
transmit the command to an electronic control system of the first vehicle that results in the first condition of the first vehicle being changed to correspond to the second condition while the first vehicle is on the thoroughfare on the date and at the time of day.

6. The system of claim 5, wherein the first condition indicates that headlights are turned off and the second condition indicates that headlights are turned on, wherein the environmental condition is associated with a level of environmental illumination, and wherein transmitting the command to the electronic control system of the first vehicle switches headlights of the first vehicle from off to on.

7. The system of claim 5, wherein the first condition indicates that windshield wipers are turned off and the second condition indicates that windshield wipers are turned on, wherein the environmental condition is associated with weather, and wherein transmitting the command to the electronic control system of the first vehicle switches windshield wipers of the first vehicle from off to on.

8. The system of claim 5, wherein the first condition indicates that automated driving assistance is turned off and the second condition indicates that automated driving assistance is turned on, and wherein transmitting the command to the electronic control system of the first vehicle switches automated driving assistance of the first vehicle from off to on.

9. A non-transitory computer-readable storage media having embodied thereon a program executable by a processor for implementing a method for automated vehicle control, the method comprising:
receiving a first condition of a first vehicle from a first telemetric device carried by the first vehicle, wherein the first vehicle is on a thoroughfare on a date at a time of day;
receiving a second condition of a second vehicle from a second telemetric device carried by the second vehicle, wherein the second vehicle is on the thoroughfare on the date at the time of day, wherein the second condition is different from the first condition;
determining an environmental condition of at least the thoroughfare on the day at the time of day;
identifying a first safety score associated with the first condition during the environmental condition of at least the thoroughfare on the date at the time of day based on a first query of a database that indicates respective safety scores corresponding to different vehicle conditions during different environmental conditions;
identifying a second safety score associated with the second condition during the environmental condition of at least the thoroughfare on the date at the time of day based on a second query of the database;
generating a command based on an identification that the second safety score exceeding the first safety score; and
transmitting the command to an electronic control system of the first vehicle that results in the first condition of the first vehicle being changed to correspond to the second condition while the first vehicle is on the thoroughfare on the date and at the time of day.

10. The non-transitory computer-readable storage media of claim 9, wherein the first condition indicates that headlights are turned off and the second condition indicates that headlights are turned on, wherein the environmental condition is associated with a level of environmental illumination, and wherein transmitting the command to the electronic control system of the first vehicle switches headlights of the first vehicle from off to on.

11. The non-transitory computer-readable storage media of claim 9, wherein the first condition indicates that windshield wipers are turned off and the second condition indicates that windshield wipers are turned on, wherein the environmental condition is associated with weather, and wherein transmitting the command to the electronic control system of the first vehicle switches windshield wipers of the first vehicle from off to on.

12. The non-transitory computer-readable storage media of claim 9, wherein the first condition indicates that automated driving assistance is turned off and the second condition indicates that automated driving assistance is turned on, and wherein transmitting the command to the electronic control system of the first vehicle switches automated driving assistance of the first vehicle from off to on.

\* \* \* \* \*